(12) United States Patent
Lee et al.

(10) Patent No.: US 10,585,498 B2
(45) Date of Patent: Mar. 10, 2020

(54) APPARATUS AND METHOD FOR IDENTIFYING OBJECT

(71) Applicant: Samsung Electronics Co., Ltd., Suwon-si, Gyeonggi-do (KR)

(72) Inventors: Joo-Hoon Lee, Yongin-si (KR); Jin-Hong Jeong, Yongin-si (KR); Ki-Huk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 14/862,840

(22) Filed: Sep. 23, 2015

(65) Prior Publication Data

US 2016/0084781 A1 Mar. 24, 2016

(30) Foreign Application Priority Data

Sep. 24, 2014 (KR) .......................... 10-2014-0127720

(51) Int. Cl.
*G01R 27/28* (2006.01)
*G06F 3/0354* (2013.01)
(Continued)

(52) U.S. Cl.
CPC .......... *G06F 3/03545* (2013.01); *G06F 3/038* (2013.01); *G06F 3/046* (2013.01);
(Continued)

(58) Field of Classification Search
CPC ..... G01N 27/023; G06F 3/038; G06F 3/0485; G06F 3/0486; G06F 3/04883; G06F 3/041; G06F 3/0418; G06F 3/046; G06F 3/033; G06F 3/03545; G06F 3/0412; G06F 2203/04103; G06F 2203/04106;
(Continued)

(56) References Cited

U.S. PATENT DOCUMENTS 5,414,226 A * 5/1995 Matsushima ........... G06F 3/046
178/18.07
5,592,197 A * 1/1997 Tagawa .................. G06F 3/041
345/104

(Continued)

FOREIGN PATENT DOCUMENTS

CN 102053727 A 5/2011
CN 102692607 A 9/2012
(Continued)

OTHER PUBLICATIONS

Chinese Office Action dated Nov. 5, 2019, issued in Chinese Application No. 201510616485.1.
(Continued)

*Primary Examiner* — Thang X Le
(74) *Attorney, Agent, or Firm* — Jefferson IP Law, LLP

(57) ABSTRACT

An element device and a method for identifying an object are provided. The method includes applying a current to a first coil from among a plurality of coils of the electronic device, measuring an induced current of a second coil among the plurality of coils, the second coil adjacent to the first coil, identifying information on an object which is located outside the electronic device based on the induced current, and performing a designated function based on a result of the identifying.

15 Claims, 26 Drawing Sheets

(51) Int. Cl.
  *G06F 3/0486*   (2013.01)
  *G06F 3/0485*   (2013.01)
  *G06F 3/046*    (2006.01)
  *G06F 3/038*    (2013.01)
  *G06F 3/0488*   (2013.01)

(52) U.S. Cl.
  CPC .......... *G06F 3/0485* (2013.01); *G06F 3/0486* (2013.01); *G06F 3/04883* (2013.01); *G06F 2203/0382* (2013.01); *G06F 2203/04106* (2013.01); *G06F 2203/04806* (2013.01)

(58) Field of Classification Search
  CPC .................... G06F 2203/04107; G01D 5/208; G01D 5/24; G01D 5/2417
  See application file for complete search history.

(56) References Cited

U.S. PATENT DOCUMENTS

| | | | |
|---|---|---|---|
| 5,691,511 A * | 11/1997 | Matsushima | G06F 3/046 178/18.04 |
| 6,489,899 B1 * | 12/2002 | Ely | G01D 5/2073 178/18.06 |
| 9,671,918 B2 * | 6/2017 | Tsuchihashi | G06F 3/046 |
| 2007/0018076 A1 * | 1/2007 | Chen | G06F 3/0412 250/208.2 |
| 2007/0085836 A1 * | 4/2007 | Ely | G06F 3/03545 345/173 |
| 2007/0188933 A1 | 8/2007 | Carey | |
| 2008/0012558 A1 | 1/2008 | Rossler et al. | |
| 2008/0019055 A1 | 1/2008 | Gurney et al. | |
| 2008/0122801 A1 | 5/2008 | Ko et al. | |
| 2009/0166100 A1 | 7/2009 | Matsubara | |
| 2011/0080378 A1 | 4/2011 | Hsu | |
| 2011/0297457 A1 | 12/2011 | Yeh et al. | |
| 2012/0127132 A1 * | 5/2012 | Katsurahira | G06F 3/03545 345/179 |
| 2013/0249871 A1 * | 9/2013 | Yoo | G06F 3/03545 345/179 |
| 2014/0009416 A1 | 1/2014 | Son et al. | |
| 2014/0022193 A1 | 1/2014 | Kim et al. | |
| 2014/0146003 A1 | 5/2014 | Jang et al. | |
| 2014/0218338 A1 | 8/2014 | Kim | |
| 2014/0258901 A1 | 9/2014 | Cho | |
| 2014/0258944 A1 | 9/2014 | Jin et al. | |
| 2015/0102806 A1 * | 4/2015 | Tsuchihashi | G06F 3/046 324/207.17 |

FOREIGN PATENT DOCUMENTS

| | | |
|---|---|---|
| CN | 103529981 A | 1/2014 |
| CN | 103543944 A | 1/2014 |
| CN | 103838400 A | 6/2014 |
| CN | 104035710 A | 9/2014 |
| KR | 10-2014-0100744 A | 8/2014 |

OTHER PUBLICATIONS

European Office Action dated Sep. 4, issued in European Application No. 15 843 610.5-1216.

* cited by examiner

| Rx/Tx | X0 | X1 | X2 | X3 | X4 | X5 | X6 | ... | X17 | X18 | X19 | X20 | X21 | X22 | X23 | X24 | X25 | X26 |
|---|---|---|---|---|---|---|---|---|---|---|---|---|---|---|---|---|---|---|
| X0 | 0 | | | | | | | ... | | | | | | | | | | |
| X1 | | -4 | | | | | 18 | ... | | | | | | | | 7 | | |
| X2 | | | | | | | | ... | | | | | | | | | | |
| X3 | | | | 0 | | | | ... | | | -1 | | | | | | | |
| X4 | | | | | | | | ... | 4 | | | | | | | | | |
| X5 | | | | | | | | ... | | | | | | -8 | | | | |
| X6 | | | | | -7 | | | ... | | | -5 | | | | | | | |
| ... | ... | ... | ... | ... | ... | ... | ... | ... | ... | ... | ... | ... | ... | ... | ... | ... | ... | ... |
| X18 | | | | | | | -12 | ... | | | | | 1 | | | | 2 | |
| X19 | | -9 | | | | | | ... | | -4 | | | 18 | | -14 | | -9 | |
| X20 | | | | | | 2 | -5 | ... | -1 | | | 0 | 54 | 67 | 31 | 2 | 51 | 25 |
| X21 | | | | -4 | | | | ... | | | | 59 | 0 | 208 | 72 | 12 | 131 | 304 |
| X22 | | | | | | | | ... | | -10 | | 61 | 203 | 1 | 276 | 86 | -15 | 337 |
| X23 | | | | | | | | ... | | | | 30 | 68 | 271 | 1 | 433 | 251 | 108 |
| X24 | | 1 | | | 2 | | | ... | | | | -2 | 21 | 87 | 441 | 1 | 816 | 579 |
| X25 | | | | | | | | ... | | | | 52 | 123 | -18 | 260 | 809 | 2 | 252 |
| X26 | | | | | | | | ... | | | | 42 | 303 | 329 | 99 | 578 | 258 | 0 |

FIG. 9

APPARATUS AND METHOD FOR IDENTIFYING OBJECT

CROSS-REFERENCE TO RELATED APPLICATION(S)

This application claims the benefit under 35 U.S.C. § 119(a) of a Korean patent application filed on Sep. 24, 2014 in the Korean Intellectual Property Office and assigned Serial number 10-2014-0127720, the entire disclosure of which is hereby incorporated by reference.

TECHNICAL FIELD

The present disclosure relates to an apparatus and method for identifying an object.

BACKGROUND

As the technology of electronic devices has developed, the electronic devices are able to detect inputs from various input tools.

For example, the electronic device is able to receive a predetermined input from an input tool which uses an electromagnetic resonance (EMR) phenomenon.

Therefore, the electronic device is able to perform various functions using an input tool and the EMR phenomenon.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for automatically performing a function related to an object when one or more designated objects are located within a designated range, thereby improving user convenience.

Another aspect of the present disclosure is to provide an apparatus and method which, when a designated object is a pen-type object, may identify an input surface of the object and perform designated various functions.

Another aspect of the present disclosure is to provide an apparatus and method which may perform a designated different function by receiving an input on a first input surface or a second input surface of an object since the first input surface is provided with a resonant circuit and the second input surface is provided with a magnet.

In accordance with an aspect of the present disclosure, a method of an electronic device is provided. The method includes applying a current to a first coil from among a plurality of coils of the electronic device, measuring an induced current of a second coil among the plurality of coils, the second coil adjacent to the first coil, identifying information on an object which is located outside the electronic device based on the induced current, and performing a designated function based on a result of the identifying.

In accordance with another aspect of the present disclosure, an electronic device is provided. The electronic device includes a processor configured to apply a current to a first coil from among a plurality of coils of the electronic device and measure an induced current of a second coil among the plurality of coils, the second coil adjacent to the first coil, identify information on an object which is located outside the electronic device based on the induced current, and perform a designated function based on a result of the identifying, and a memory configured to store data which is controlled by the processor.

In accordance with another aspect of the present disclosure, a method of an electronic device is provided. The method includes sensing an object using a frequency discharged from the object which is located outside within a designated distance from the electronic device, identifying information on the object based on the frequency, performing a designated function based on a result of the identifying, when the object is identified as a pen-type object, determining an input surface of the object, and performing a first function or a second function according to the determined input surface.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 illustrates a table showing values based on a difference between pre-degradation and post-degradation of a magnetic shielding layer caused by a magnetic flux according to various embodiments of the present disclosure;

Throughout the drawings, it should be noted that like reference numbers are used to depict the same or similar elements, features, and structures.

DETAILED DESCRIPTION

Figure 1:
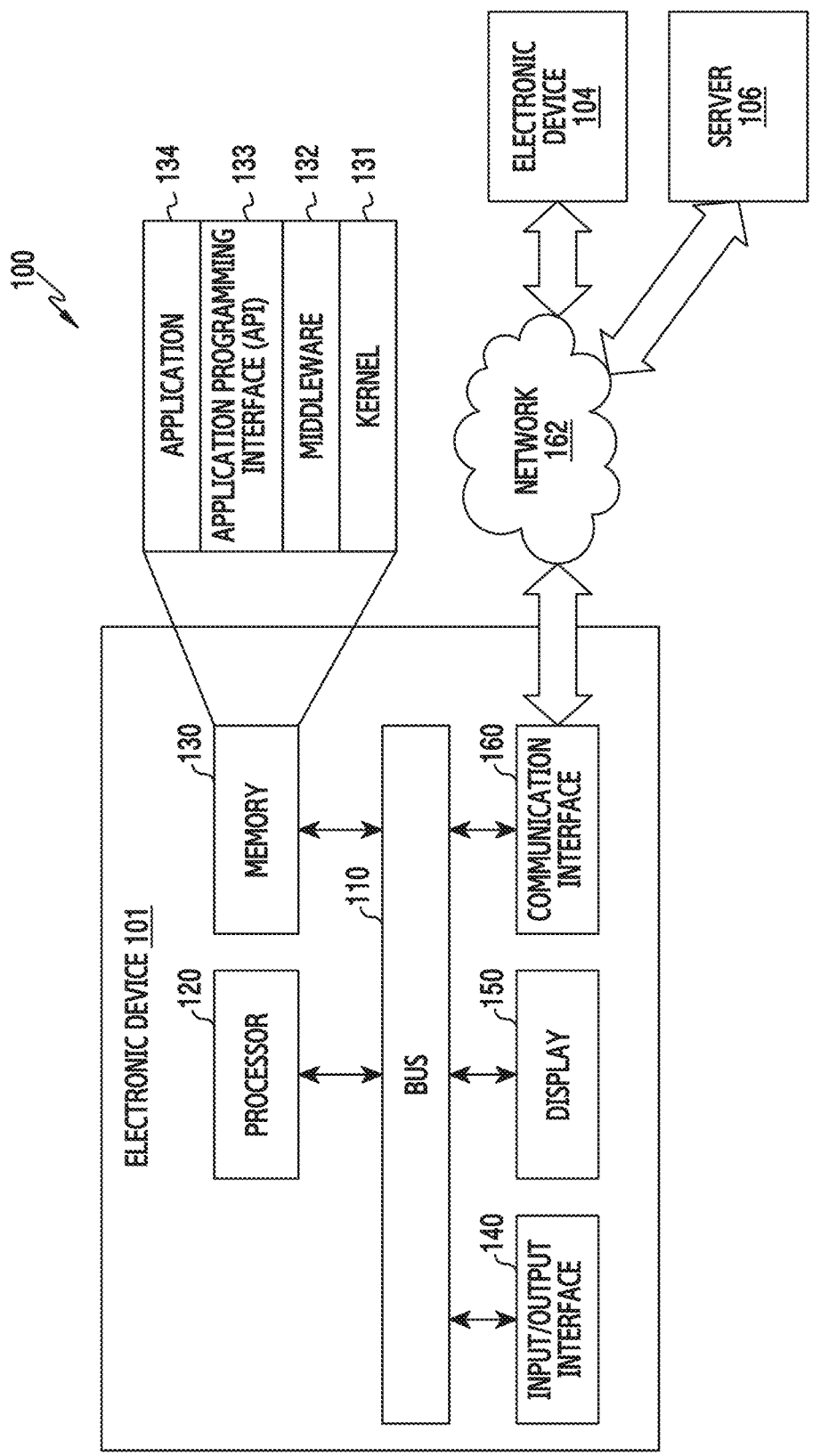
FIG. 1 illustrates a view showing a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have," "may have," "include," or "may include" used in the various embodiments of the present disclosure indicate the presence of corresponding characteristics (e.g., numerical values, functions, operations, parts, and the like), and do not preclude the presence of additional characteristics.

The terms "A or B," "at least one of A or/and B," or "one or more of A or/and B" used in the various embodiments of the present disclosure include all possible combinations of items enumerated with them. For example, "A or B," "at least one of A and B," or "at least one of A or B" indicate all of the cases of (1) including at least one A, (2) including at least one B, or (3) including both at least one A and at least one B.

The terms such as "first" and "second" used in the various embodiments of the present disclosure may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be named a second element without departing from the scope of right of the various embodiments of the present disclosure, and similarly, a second element may be named a first element.

It will be understood that, when an element (e.g., a first element) is mentioned as being "operatively or communicatively coupled with/to" or "connected to" another element (e.g., a second element), the element may be directly coupled or connected to another element, or there may be an intervening element (e.g., a third element) between the element and another element. On the other hand, it will be understood that, when an element (e.g., a first element) is mentioned as being "directly coupled" or "directly connected" to another element (e.g., a second element), there is no intervening element (e.g., a third element) between the element and another element.

The term "configured (or set) to . . . " used in the various embodiments may be interchangeably used with the terms "suitable for . . . ," "having the capacity to . . . ," "designed to . . . ," "adapted to . . . ," "made to . . . ," or "capable of . . . " depending on the situation. The term "configured (or set) to . . . " does not necessarily mean "specifically designed to . . . " in a hardware level. Instead, in a certain situation, the term "a device configured to . . . " may mean "the device is capable of . . . " with another device or parts. For example, "a processor configured (set) to perform A, B, and C" may mean a dedicated processor (e.g., an embedded processor) for performing a corresponding operation, or a generic-purpose processor (e.g., a central processing unit (CPU) or an application processor (AP)) for performing corresponding operations by executing one or more software programs stored in a memory device.

The terms used in the various embodiments of the present disclosure are for the purpose of describing specific embodiments only and are not intended to limit the scope of other embodiments. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various embodiments. According to circumstances, the terms defined in the various embodiments should not be interpreted as excluding the various embodiments of the present disclosure.

An electronic device according to various embodiments of the present disclosure may include at least one of a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a mobile medical machine, a camera, or a wearable device (e.g., smart glasses, a head-mounted-device (HMD), electronic clothing, an electronic bracelet, an electronic necklace, an electronic appcessory, electronic tattoos, a smart mirror, or a smartwatch).

According to an embodiment, the electronic device may be a smart home appliance. For example, the smart home appliance may include at least one of a television, a digital video disc (DVD) player, a stereo, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™, PlayStation™), an electronic dictionary, an electronic key, a camcorder, or an electronic album.

According to an embodiment, the electronic device may include at least one of various medical machines (e.g., various portable medical measurement devices (a blood glucose monitoring device, a heart rate monitor, a blood pressure measuring device, or a thermometer), magnetic resonance angiography (MRA), magnetic resonance imaging (MRI), computerized tomography (CT), a tomograph, an ultrasound machine, and the like), a navigation device, a global positioning system (GPS) receiver, an event data recorder (EDR), a flight data recorder (FDR), an automotive infotainment device, electronic equipment for ship (e.g., a navigation equipment for ship, a gyro compass, and the like), avionics, a security device, a head unit for vehicle, an industrial or home robot, an automatic teller's machine of a financial institution, a point of sales (POS) of a store, or Internet of things (IoT) (e.g., a bulb, various sensors, an electricity or gas meter, a sprinkler device, a fire alarm, a thermostat, a streetlamp, a toaster, fitness equipment, a hot water tank, a heater, a boiler, etc).

According to an embodiment, the electronic device may include at least one of a part of furniture or a building/a structure, an electronic board, an electronic signature receiving device, a projector, and various measurement devices (e.g., water, power, gas, radio waves, and the like). According to various embodiments of the present disclosure, the electronic device may be one or a combination of one or more of the above-mentioned devices. In addition, it is obvious to an ordinary skilled person in the related art that the electronic device according to various embodiments of the present disclosure is not limited to the above-mentioned devices and may include a new electronic device as the technology advances.

Hereinafter, an electronic device according to various embodiments will be explained with reference to the accompanying drawings. The term "user" used in the various embodiments may refer to a person who uses the electronic device or a device that uses the electronic device (e.g., an artificial intelligence electronic device).

FIG. 1 illustrates a view showing a network environment including an electronic device according to various embodiments of the present disclosure.

Referring to FIG. 1, an electronic device 101 of a network environment 100 may include a bus 110, a processor 120, a memory 130, an input and output interface 140, a display 150, and a communication interface 160.

The bus 110 may be a circuit that connects the above-described elements with one another and transmits communication (e.g., a control message) between the above-described elements.

The processor 120 may receive instructions from the other elements (e.g., the memory 130, the input and output interface 140, the display 150, or the communication interface) via the bus 110, decipher the instructions, and perform calculation or data processing according to the deciphered instructions.

The memory 130 may store instructions and/or data which is received from or generated by the processor 120 or the other elements (e.g., the input and output interface 140, the display 150, the communication interface 160, and the like). For example, the memory 130 may include programming modules such as a kernel 131, middleware 132, an application programming interface (API) 133, an application 134, and the like. Each of the above-described programming modules may be configured by software, firmware, hardware, or a combination of two or more of them.

The kernel 131 may control or manage system resources (e.g., the bus 110, the processor 120, the memory 130, and the like) which are used for performing operations or functions implemented in the other programming modules, for example, the middleware 132, the API 133, or the application 134. In addition, the kernel 131 may provide an interface for allowing the middleware 132, the API 133, or the application 134 to access an individual element of the electronic device 101 and control or manage the element.

The middleware 132 may serve as an intermediary to allow the API 133 or the application 134 to communicate with the kernel 131 and exchange data with the kernel 131. In addition, the middleware 132 may perform controlling (e.g., scheduling or load balancing) with respect to work requests received from the application 134, for example, by giving priority to use the system resources of the electronic device 101 (e.g., the bus 110, the processor 120, the memory 130, and the like) to at least one of the applications 134.

The API 133 may be an interface for allowing the application 134 to control a function provided by the kernel 131 or the middleware 134, and, for example, may include at least one interface or function (e.g., instructions) for controlling a file, controlling a window, processing an image, or controlling a text.

According to various embodiments of the present disclosure, the application 134 may include a short message service (SMS)/multimedia messaging service (MMS) application, an email application, a calendar application, a notification application, a health care application (e.g., an application for measuring exercise or blood glucose), an environment information application (e.g., an application for providing information on atmospheric pressure, humidity, or temperature), and the like. Additionally or alternatively, the application 134 may be an application related to information exchange between the electronic device 101 and an external electronic device (e.g., an electronic device 104). For example, the application related to the information exchange may include a notification relay application for relaying specific information to the external electronic device or a device management application for managing the external electronic device.

For example, the notification relay application may include a function of relaying notification information generated by other applications of the electronic device 101 (e.g., the SMS/MMS application, the email application, the health care application, the environment information application, and the like) to the external electronic device (e.g., the electronic device 104). Additionally or alternatively, the notification relay application may receive notification information from the external electronic device (e.g., the electronic device 104) and may provide the same to the user. For example, the device management application may manage (e.g., install, delete or update) a function regarding at least part of the external electronic device (e.g.: the electronic device 104) communicating with the electronic device 101 (e.g., turning on/off the external electronic device (or some parts) or adjusting brightness of a display), an application operating in the external electronic device or a service provided by the external electronic device (e.g.: a calling service or a message service).

According to various embodiments of the present disclosure, the application 134 may include an application specified according to an attribute (e.g., a kind of an electronic device) of the external electronic device (e.g., the electronic device 104). For example, when the external electronic device is an MP3 player, the application 134 may include an application related to music replay. Similarly, when the external electronic device is a mobile medical device, the application 134 may include an application related to health care. According to an embodiment, the application 134 may include at least one of an application specified by the electronic device 101 or an application received from the external electronic device (e.g., a server 106 or the electronic device 104).

The input and output interface 140 may transmit instructions or data input by a user through an input and output device (e.g., a sensor, a keyboard or a touch screen) to the processor 120, the memory 130, or the communication interface 160 through the bus 110, for example. For example, the input and output interface 140 may provide data on a user's touch input through a touch screen to the processor 120. In addition, the input and output interface 140 may output instructions or data received from the processor 120, the memory 130, or the communication interface 160 through the bus 110 through the input and output device (e.g., a speaker or a display). For example, the input and output interface 140 may output voice data processed through the processor 120 to the user through a speaker.

The display 150 may display a variety of information (e.g., multimedia data, text data, and the like) for the user.

The communication interface 160 may connect communication between the electronic device 101 and the external device (e.g., the electronic device 104 or the server 106). For example, the communication interface 160 may be connected with a network 162 through wireless communication or wire communication and communicate with the external device. The wireless communication may include at least one of Wi-Fi, Bluetooth (BT), near field communication (NFC), a GPS, or cellular communication (e.g., long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), or the like). The wire communication may include at least one of a universal serial bus (USB), a high definition multimedia interface (HDMI), recommended standard 232 (RS-232), or plain old telephone service (POTS).

According to an embodiment, the network 162 may be a telecommunications network. The telecommunications network may include at least one of a computer network, Internet, Internet of Things, or a telephone network. According to an embodiment, a protocol for communicating between the electronic device 101 and the external device (e.g., a transport layer protocol, a data link layer protocol, or a physical layer protocol) may be supported in at least one of the application 134, the application programming interface 133, the middleware 132, the kernel 131, or the communication interface 160.

Figure 2:
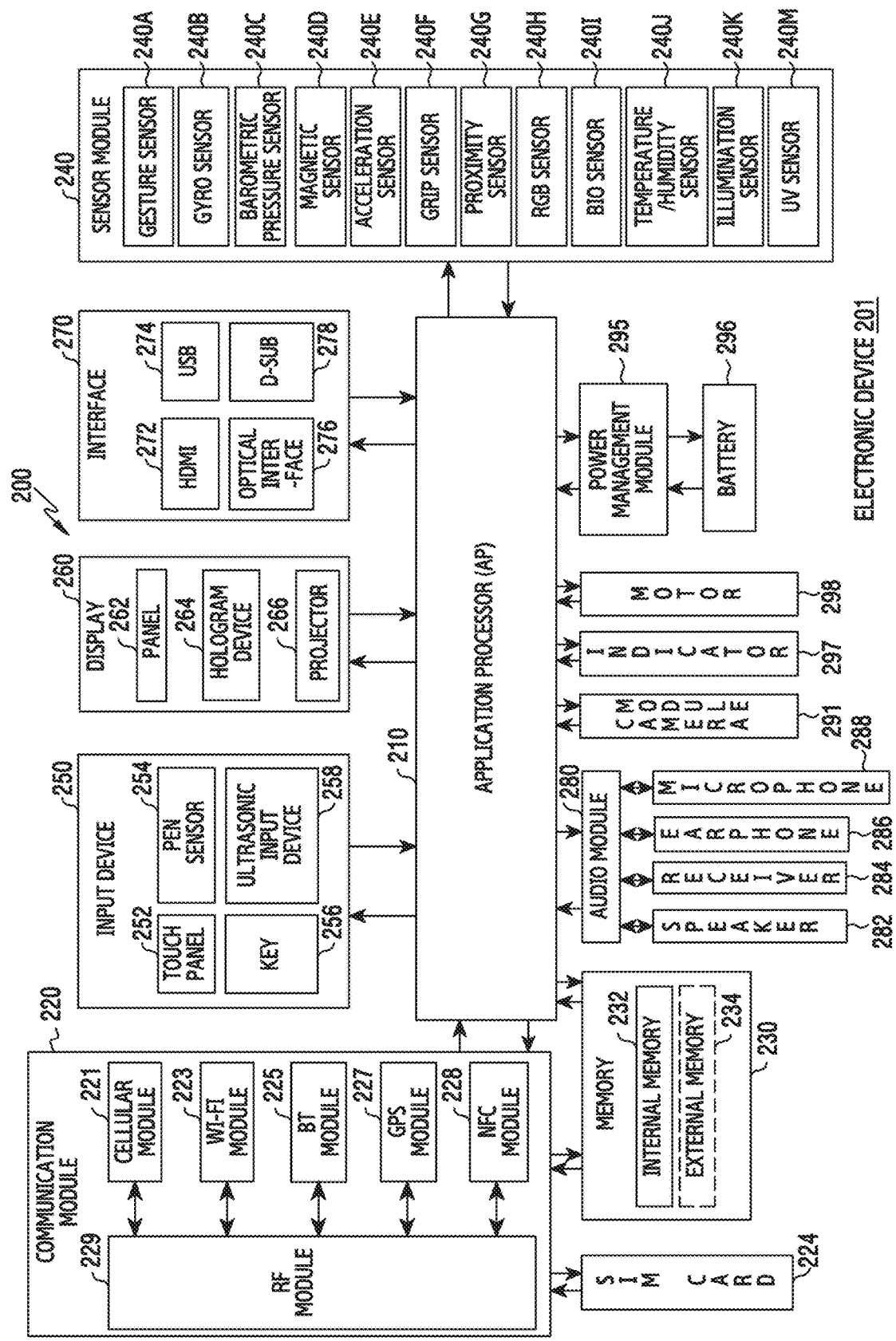
FIG. 2 illustrates a block diagram showing an electronic device according to various embodiments of the present disclosure.

FIG. 2 illustrates a block diagram of an electronic device according to various embodiments of the present disclosure. The electronic device may configure the entirety or part of the electronic device 101 shown in FIG. 1.

Referring to FIG. 2, an electronic device 201 of block diagram 200 may include one or more APs 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, or a motor 298.

The AP 210 may control a plurality of hardware or software elements connected to the AP 210 by driving an operating system or an application program, and may process and calculate a variety of data including multimedia data. For example, the AP 210 may be implemented by using a system on chip (SoC). According to an embodiment, the AP 210 may further include a graphic processing unit (GPU) (not shown).

The communication module 220 (e.g., the communication interface 160) may transmit and receive data via communication between the electronic device 201 (e.g., the electronic device 101) and other electronic devices (e.g., the electronic device 104 or the server 106) connected through a network. According to an embodiment, the communication module 220 may include a cellular module 221, a Wi-Fi module 223, a BT module 225, a GPS module 227, an NFC module 228, and a radio frequency (RF) module 229.

The cellular module 221 may provide a voice call, a video call, a text service, or an interne service through a telecommunications network (e.g., LTE, LTE-A, CDMA, WCDMA, UMTS, WiBro, GSM, and the like). In addition, the cellular module 221 may identify and authenticate the electronic device in the telecommunications network by using a SIM (e.g., the SIM card 224). According to an embodiment, the cellular module 221 may perform at least some of the functions provided by the AP 210. For example, the cellular module 221 may perform at least some of the multimedia control functions.

According to an embodiment, the cellular module 221 may include a communication processor (CP). In addition, the cellular module 221 may be implemented by using a SoC, for example. Referring to FIG. 2, the cellular module 221 (e.g., the communication processor), the memory 230, or the power management module 295 are elements separate from the AP 210. However, according to an embodiment, the AP 210 may be configured to include at least some of the above-described elements (e.g., the cellular module 221).

According to an embodiment, the AP 210 or the cellular module 221 (e.g., the communication processor) may load instructions or data received from a non-volatile memory connected therewith or at least one of the other elements into a volatile memory, and may process the instructions or data. In addition, the AP 210 or the cellular module 221 may store data which is received from at least one of the other elements or generated by at least one of the other elements in the non-volatile memory.

The Wi-Fi module 223, the BT module 225, the GPS module 227, or the NFC module 228 each may include a processor for processing data received and transmitted through a corresponding module. Referring to FIG. 2, the cellular module 221, the Wi-Fi module 223, the BT module 225, the GPS module 227, or the NFC module 228 is illustrated in a separate block. However, according to an embodiment, at least some (e.g., two or more) of the cellular module 221, the Wi-Fi module 223, the BT module 225, the GPS module 227, or the NFC module 228 may be included in a single integrated chip (IC) or a single IC package. For example, at least some of the processors corresponding to the cellular module 221, the Wi-Fi module 223, the BT module 225, the GPS module 227, and the NFC module 228 (e.g., the communication processor corresponding to the cellular module 221 and the Wi-Fi processor corresponding to the Wi-Fi module 223) may be implemented by using a single SoC.

The RF module 229 may transmit and receive data, for example, may transmit and receive an RF signal. Although not shown, the RF module 229 may include a transceiver, a power amp module (PAM), a frequency filter, or a low noise amplifier (LNA), for example. In addition, the RF module 229 may further include a part for exchanging electromagnetic waves in a free space in wireless communication, for example, a conductor or conducting wire. Referring to FIG. 2, the cellular module 221, the Wi-Fi module 223, the BT module 225, the GPS module 227, and the NFC module 228 share the single RF module 229 with one another. However, according to an embodiment, at least one of the cellular module 221, the Wi-Fi module 223, the BT module 225, the GPS module 227, or the NFC module 228 may transmit and receive an RF signal through a separate RF module.

The SIM card 224 may be a card including a subscriber identification module, and may be inserted into a slot formed on a specific location of the electronic device. The SIM card 224 may include unique identification information (e.g., an integrated circuit card identifier (ICCID)) or subscriber information (e.g., international mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a Synchronous DRAM (SDRAM), and the like) and a non-volatile memory (e.g., a one-time programmable read only memory (OTPROM), a programmable ROM (PROM), an erasable programmable ROM (EPROM), an electrically erasable programmable ROM (EEPROM), a mask ROM, a flash ROM, a not and (NAND) flash memory, a not or (NOR) flash memory, and the like).

According to an embodiment, the internal memory 232 may be a solid state drive (SSD). The external memory 234 may further include a flash drive, for example, compact flash (CF), secure digital (SD), Micro-SD, Mini-SD, extreme-Digital (xD), a memory stick, and the like. The external memory 234 may be functionally connected with the electronic device 201 through various interfaces. According to an embodiment, the electronic device 201 may further include a storage device (or a storage medium) such as a hard drive.

The sensor module 240 may measure a physical quantity or detect an operation state of the electronic device 201, and may convert measured or detected information into electric signals. The sensor module 240 may include at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., red, green, blue (RGB) sensor), a biosensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared ray (IR) sensor, an iris sensor (not shown), a fingerprint sensor (not shown), and the like. The sensor module 240 may further include a control circuit to control at least one sensor included therein.

The input device 250 may include a touch panel 252, a (digital) pen sensor 254, a key 256, or an ultrasonic input device 258. The touch panel 252 may recognize a touch input in at least one method of capacitive, resistive, infrared, and ultrasonic methods. In addition, the touch panel 252 may further include a control circuit (not shown). In the embodiment of a capacitive method, the touch panel 252 may recognize physical contact or hovering. The touch panel 252 may further include a tactile layer. In this embodiment, the touch panel 252 may provide a tactile response to the user.

The (digital) pen sensor 254 may be implemented in the same or similar method as or to the method of receiving a user's touch input or by using a separate detection sheet. The key 256 may include a physical button, an optical key, or a keypad. The ultrasonic input device 258 allows the electronic device 201 to detect sound waves through a microphone (e.g., the microphone 288) through an input tool generating ultrasonic signals and identify data, and is capable of wireless recognition. According to an embodiment, the electronic device 201 may receive a user input from an external device connected thereto (e.g., a computer or a server) by using the communication module 220.

The display 260 (e.g., the display 150) may include a panel 262, a hologram device 264, or a projector 266. For example, the panel 262 may be a liquid crystal display (LCD) or an active matrix organic light emitting diode (AM-OLED). For example, the panel 262 may be implemented to be flexible, transparent, or wearable. The panel 262 may be configured as a single module along with the touch panel 252. The hologram device 264 may show a stereoscopic image in the air using interference of light. The projector 266 may display an image by projecting light onto a screen. The screen may be located inside or outside the electronic device 201. According to an embodiment, the display 260 may further include a control circuit to control the panel 262, the hologram device 264, or the projector 266.

The interface 270 may include an HDMI 272, a USB 274, an optical interface 276, or D-subminiature (D-sub) 278.

The interface 270 may be included in the communication interface 160 shown in FIG. 1. Additionally or alternatively, the interface 270 may include a mobile high definition link (MHL) interface, an SD/multimedia card (MMC) interface or infrared data association (IrDA) standard interface.

The audio module 280 may convert a sound and an electric signal bidirectionally. At least some element of the audio module 280 may be included in the input and output interface 140 of FIG. 1. The audio module 280 may process sound information which is input or output through a speaker 282, a receiver 284, an earphone 286, or a microphone 288.

The camera module 291 is a device for photographing a still image and a moving image, and, according to an embodiment, the camera module 291 may include one or more image sensors (e.g., a front surface sensor or a rear surface sensor), a lens (not shown), an image signal processor (ISP) (not shown), or a flash (memory) (e.g., an LED or a xenon lamp).

The power management module 295 may manage power of the electronic device 201. Although not shown, the power management module 295 may include a power management IC (PMIC), a charger IC, or a battery or fuel gage.

For example, the PMIC may be mounted in an integrated circuit or a SoC semiconductor. The charging method may be divided into a wire charging method and a wireless charging method. The charger IC may charge a battery and may prevent inflow of overvoltage or over current from a charger. According to an embodiment, the charger IC may include a charger IC for at least one of the wire charging method and the wireless charging method. The wireless charging method may include a magnetic resonance method, a magnetic induction method, or an electromagnetic wave method, and an additional circuit for charging wirelessly, for example, a circuit such as a coil loop, a resonant circuit, a rectifier, and the like may be added.

For example, the battery gage may measure a remaining battery life of the battery 296, a voltage, a current, or temperature during charging. The battery 296 may store or generate electricity and may supply power to the electronic device 201 by using stored or generated electricity. The battery 296 may include a rechargeable battery or a solar battery.

The indicator 297 may display a specific state of the electronic device 201 or a part of the state (e.g., the AP 210), for example, a booting state, a message state, or a charging state. The motor 298 may convert an electric signal into a mechanical vibration. Although not shown, the electronic device 201 may include a processing device (e.g., a GPU) for supporting a mobile TV. The processing device for supporting the mobile TV may process media data according to standards such as digital multimedia broadcasting (DMB), digital video broadcasting (DVB), or media flow.

Each of the above-described elements of the electronic device according to various embodiments of the present disclosure may be comprised of one or more components, and the names of the elements may vary according to the kind of the electronic device. The electronic device according to various embodiments of the present disclosure may include at least one of the above-described elements, and some of the elements may be omitted or an additional element may be further included. In addition, some of the elements of the electronic device according to various embodiments of the present disclosure may be combined into a single entity, and may perform the same functions as those of the elements before being combined.

Figure 3A:
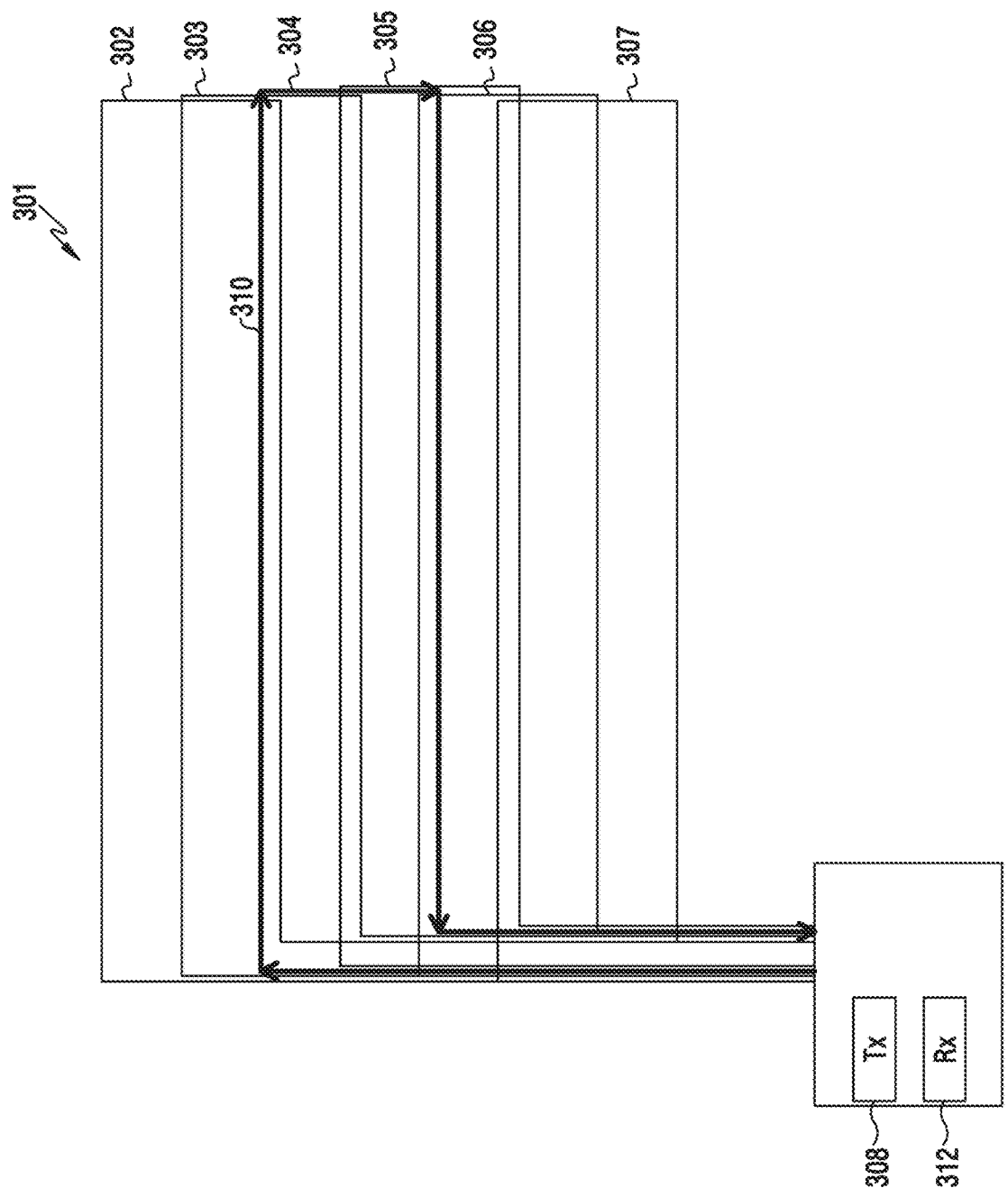
FIG. 3A illustrates a view showing a state in which a current is applied to a coil according to various embodiments of the present disclosure.
Figure 3B:
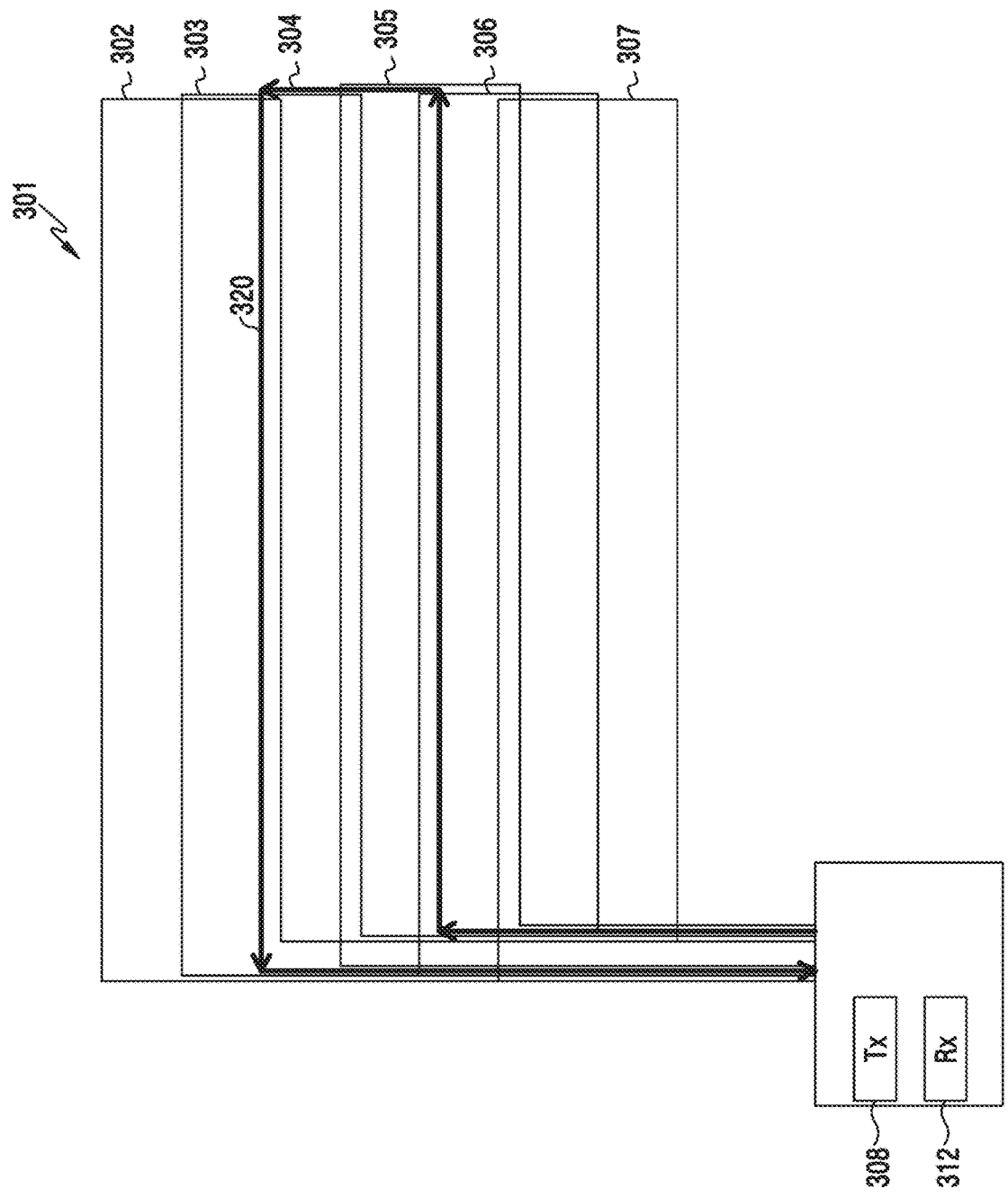
FIG. 3B illustrates a view showing a state in which a coil is connected to a reception circuit according to various embodiments of the present disclosure.

FIGS. 3A and 3B illustrate views showing a state for measuring a current which is induced in a coil according to various embodiments of the present disclosure. According to various embodiments of the present disclosure, an electronic device may apply a current to one or more coils of a plurality of coils and then measure a current which is induced in the proximity of the coil to which the current has been applied.

Referring to FIG. 3A, an electronic device 301 is provided with a plurality of coils 302 to 307, and each of the coils 302 to 307 is connected with a transmission circuit 308 and a reception circuit 312.

According to various embodiments, the transmission coil 308 which is connected with each of the plurality of coils 302 to 307 may apply a current to the first coil 304 from among the plurality of coils 302 to 307. According to an embodiment, when the transmission circuit 308 applies a current to the first coil 304, the applied current arrives at the first coil 304 through a first path 310 passing the first coil 304 in a clockwise direction. When the current passes through the first path 310 and flows in the first coil 304, a magnetic flux may be generated.

Referring to FIG. 3B, after the current is applied to the coil 304 through the transmission circuit 308, the coil 304 may be connected with the reception circuit 312.

When a device of the electromagnetic resonance (EMR)-type is in the proximity of the coil 304, the magnetic flux may be discharged toward the coil 304 by means of the device. A current flowing in a second path 320 may be induced in the coil 304 by the magnetic flux, and the current may be obtained through the reception circuit 312. An input device may determine that the device of the EMR-type is in the coil 304 based on the current flowing in the second path 320.

Figure 4:
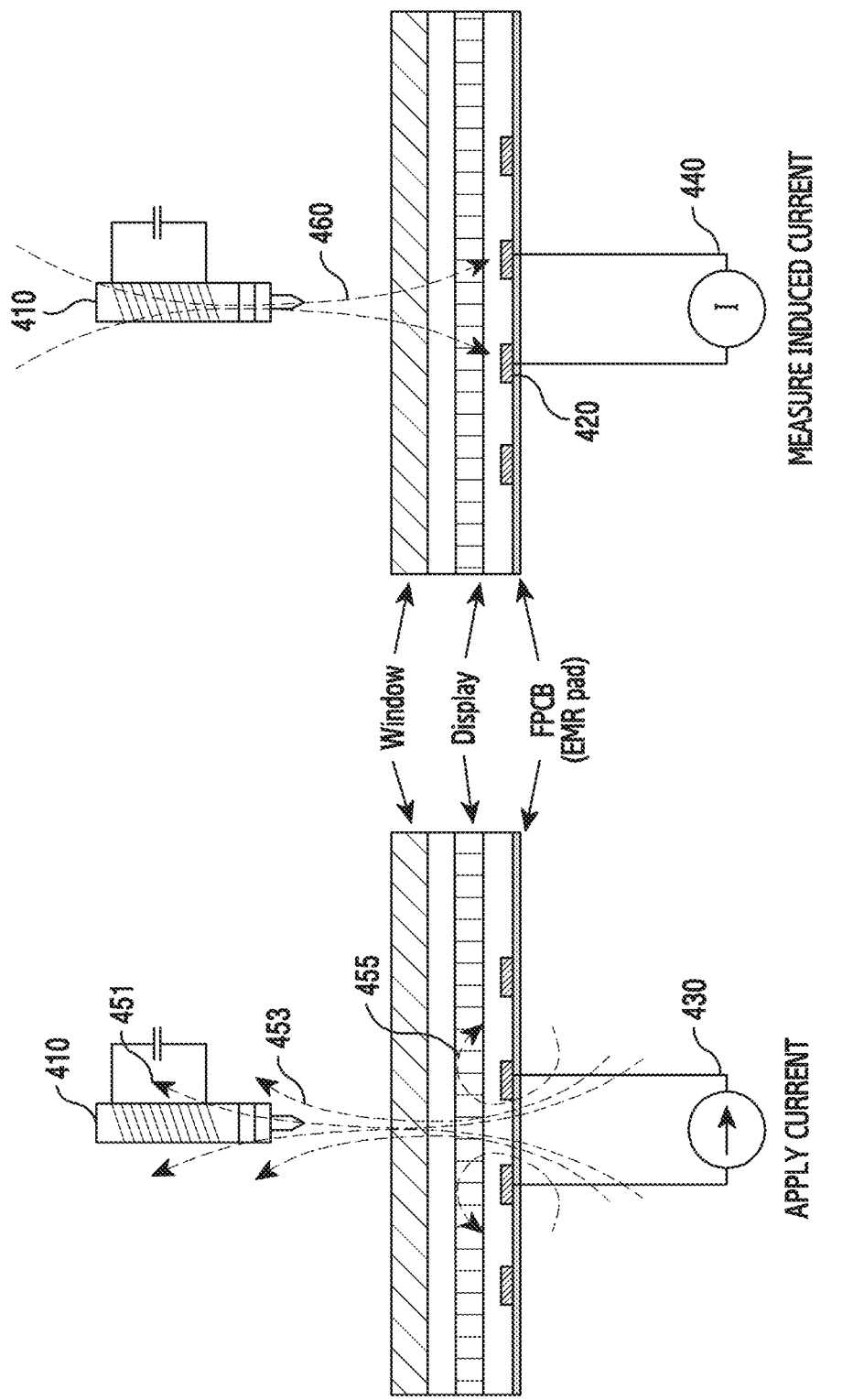
FIG. 4 illustrates a view showing a principle of generating an induced current in a coil according to various embodiments of the present disclosure.

FIG. 4 illustrates a view showing a principle of generating an induced current in a coil according to various embodiments of the present disclosure.

Referring to FIG. 4, a device according to various embodiments may identify the operations of forming a magnetic flux for an EMR device 410 by allowing a transmission circuit 430 to be connected to at least one coil 420, and receiving a magnetic flux from the EMR device 410 by allowing a reception circuit 440 to be connected to the coil 420.

When the transmission circuit 430 is connected, magnetic fluxes 451, 453, and 455 may be generated by the current flowing in the coil 420. A current may be induced for the EMR device 410 by the magnetic fluxes 451 and 453, and the EMR device 410 may have the induced current.

When the reception circuit 440 is connected, a magnetic flux is not generated any more through the coil 420 and thus the device 410 may discharge a magnetic flux 460 based on the induced current. A current may be induced in the coil 420 by the magnetic flux 460 and the reception circuit 440 may obtain the current.

Figure 5:
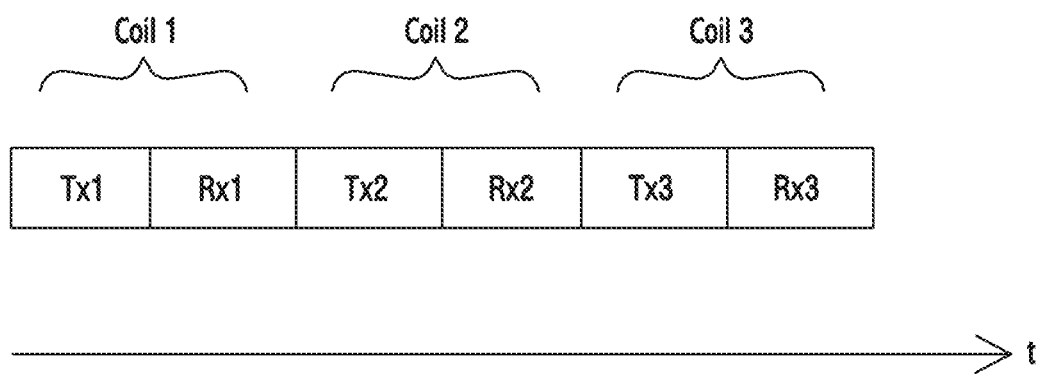
FIG. 5 illustrates a view showing operations of applying a current to a coil, stopping applying the current, and measuring an induced current, which are performed serially according to various embodiments of the present disclosure.

FIG. 5 illustrates a view showing the operations of applying a current to a coil, stopping applying the current, and measuring an induced current, which are performed serially according to various embodiments of the present disclosure.

Referring to FIG. 5, an input device of an EMR-type according to various embodiments may perform the operations of applying a current to a device of an EMR-type (e.g., a pen), stopping applying the current, and measuring an induced current serially.

For example, the input device may perform transmitting and receiving in coil 1 serially, form a magnetic flux in the device of the EMR-type by allowing a current to flow in the coil, and stop applying the current to the coil and measure a magnetic flux returning from the device of the EMR-type.

Hereinafter, a method for obtaining information on an object which discharges a magnetic flux according to various embodiments of the present disclosure will be explained.

Figure 6:
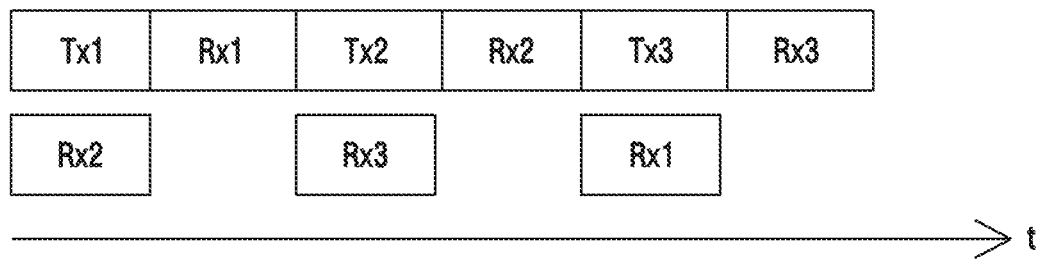
FIG. 6 illustrates a view showing an example of a process of applying a current to a coil and then measuring a current which is induced by a magnetic flux simultaneously according to various embodiments of the present disclosure.

FIG. 6 illustrates a view showing an example of a process of applying a current to a coil and then measuring a current which is induced by a magnetic flux simultaneously according to various embodiments of the present disclosure.

Referring to FIG. 6, an input device according to various embodiments of the present disclosure may measure a current induced through coil 2 while applying a current to coil 1. When a current is applied to coil 1, a magnetic flux may be generated through coil 1. In this case, a current may be induced or not in coil 2 by the magnetic flux generated through coil 1 according to whether there is an object discharging a magnetic flux. In addition, the input device may measure a current induced through coil 3 while applying a current to coil 2. In addition, the input device may measure a current induced through coil 1 while applying a current to coil 3. Regarding this, detailed information will be provided in FIGS. 7, 8, and 9. The input device may apply a current to at least one coil (e.g., coil 2) and determine information on an object discharging a magnetic flux based on a current induced in another coil (e.g., at least one of coil 1 or coil 3) in the proximity of the at least one coil. According to an embodiment, when there is no object discharging a magnetic flux, the input device may store a current value of a second coil which is measured while applying a current to a first coil. Thereafter, the input device may measure the current of the second coil while applying a current to the first coil. The input device may compare the stored current value and the measured current value, and, when a difference between the stored current value and the measured current value falls within a designated range, determine that an object discharging a magnetic flux is in the proximity of the second coil.

Figure 7:
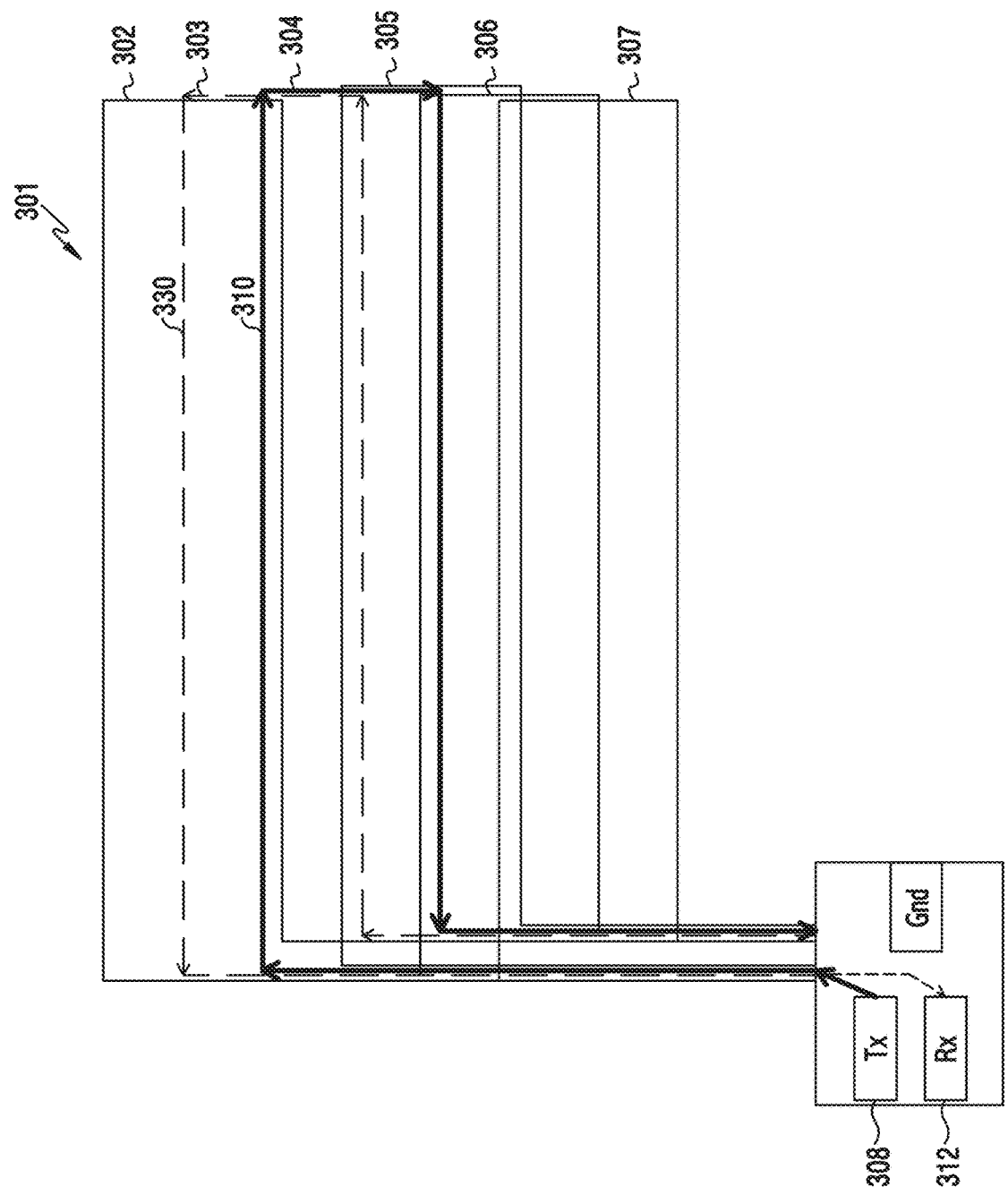
FIG. 7 illustrates a view showing a state for measuring a current induced in a coil according to various embodiments of the present disclosure.

FIG. 7 illustrates a view showing a state for measuring a current induced in a coil according to various embodiments of the present disclosure.

Referring to FIG. 7, an input device may apply a current 310 to a coil 304 and measure a current induced in a coil 303 through a third path 330. According to an embodiment, the input device may measure a current induced in at least one of coils 302, 303, 305, 306, and 307.

According to various embodiments, the input device may measure a current induced in at least one of the coils 302, 303, 305, 306, and 307 while applying a current to the coil 304. For example, a current value of a current which is induced in at least one coil may vary according to whether there is an object discharging a magnetic flux in the proximity of the input device. For example, when an object discharging a magnetic flux is in the proximity of the input device, a current may be induced in at least one coil. According to an embodiment, the input device may determine that an object discharging a magnetic flux (e.g., a magnet) is in the proximity of at least one coil based on a current induced in the at least one coil. For example, when the level of the current induced in the at least one coil is greater than or equal to a designated value, the input device may determine that an object discharging a magnet flux (e.g., a magnet) is in the proximity of the at least one coil. In addition, the input device may compare a current value which is measured in at least one coil when there is no object discharging a magnetic flux in the proximity of the coil, and a current value which is measured in at least one coil when an object discharging a magnetic flux is in the proximity of the coil, and determine that an object discharging a magnetic flux (e.g., a magnet) is in the proximity of the at least one coil.

In the embodiment of the present disclosure, the plurality of coils 302, 303, 304, 305, 306, and 307 arranged in the horizontal direction have been described by way of an example, but are not limited. According to an embodiment, the plurality of coils 302, 303, 304, 305, 306, and 307 may be arranged in the horizontal and vertical directions in a crisscross pattern, or may be arranged an irregular pattern.

According to an embodiment, the operation of scanning an induced current of a coil may include scanning a neighboring coil which is arranged in the same direction as that of a coil to which a current is applied, or scanning a neighboring coil which is arranged in a different direction. The number of times of scanning the coil in which an induced current flows may vary according to an embodiment.

Figure 8:
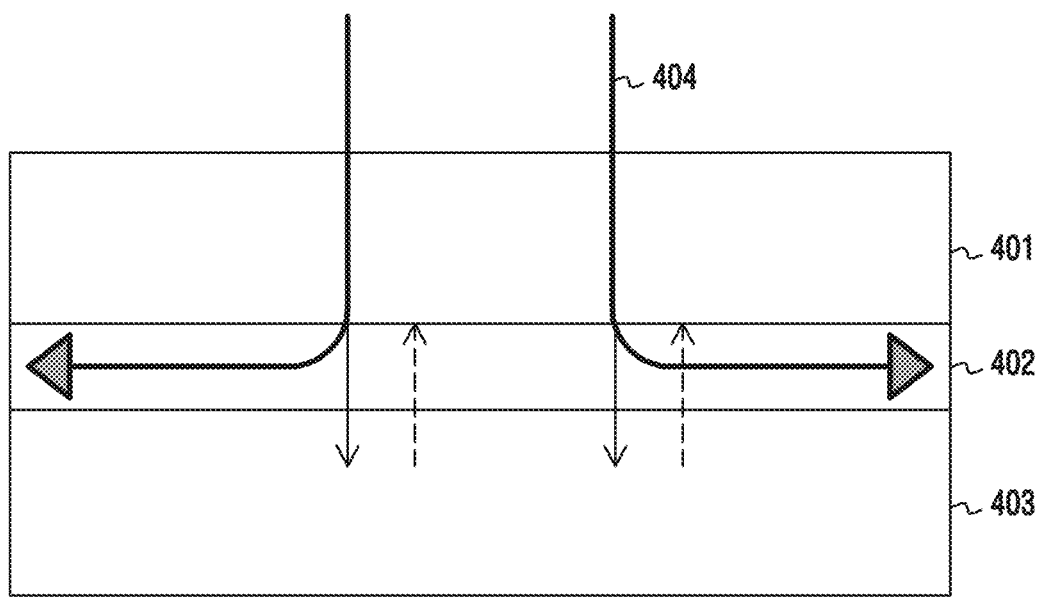
FIG. 8 illustrates a schematic side view showing an electronic device according to various embodiments of the present disclosure.

FIG. 8 illustrates a schematic side view showing an electronic device according to various embodiments of the present disclosure.

Referring to FIG. 8, the electronic device may include an input device 401 of an EMR-type, a magnetic shielding layer 402, and a metal 403.

According to various embodiments of the present disclosure, the input device 401 of the EMR method may measure a current which is induced by a magnetic flux 404 received from an object of an EMR-type.

According to various embodiments of the present disclosure, the magnetic shielding layer 402 may serve not to offset the magnetic flux received from the object of the EMR-type by cancelling a reverse magnetic flux from being generated by the metal 403. That is, the magnetic shielding layer 402 allows the input device 401 of the EMR-type to measure the current which is induced by the magnetic flux 404 received from the object of the EMR-type.

According to various embodiments of the present disclosure, the magnetic shielding layer 402 may also block a magnetic flux generated by a coil and thus may prevent the current from being induced in the second coil by the magnetic flux generated by the first coil from among the plurality of coils.

According to various embodiments of the present disclosure, when an object having a magnetic flux is located within a designated distance from the electronic device, the magnetic shielding layer 402 may have the magnetic shielding layer 402's physical property change and thus may reduce a magnetic flux blocking ratio. For example, when an object having a magnetic flux is located within a designated distance from the second coil from among the plurality of coils provided in the electronic device, a current may be induced by the first coil.

According to an embodiment, when an object having a magnetic flux is in the proximity of the magnetic shielding layer 402, the magnetic flux density of the magnetic shielding layer 402 may increase due to the magnetic flux transmitted from a magnet, and the magnetic shielding layer 402 may reach a saturation flux density. According to an embodiment, the magnetic shielding layer 402 reaching the saturation flux density cannot prevent a current from being induced in the second coil by the magnetic flux generated by the first coil, and thus the current induced by at least part of the magnetic flux generated by the first coil may be detected in the second coil.

According to various embodiments of the present disclosure, the metal 403 may be a support structure for supporting the input device 401 of the EMR method and the magnetic shielding layer 402. According to an embodiment, the metal 403 may be metal such as magnesium (Mg).

FIG. 9 illustrates a table showing values based on a difference between pre-degradation and post-degradation of a magnetic shielding layer caused by a magnetic flux according to various embodiments of the present disclosure. According to various embodiments of the present disclosure, the electronic device may detect that an object having a magnetic flux is located on a specific location according to the degree of change caused by degradation of the magnetic shielding layer provided in the electronic device.

According to an embodiment, the electronic device may detect a table having values based on a difference between pre-degradation and post-degradation of the magnetic shielding layer caused by the magnetic flux. Hereinafter, the table according to the present embodiment will be explained in detail.

Referring to FIG. 9, an x-axis direction of the table shows coils which are connected with a transmission circuit, and a y-axis direction of the table shows coils which are connected with a reception circuit. According to an embodiment, the values in the table are based on a difference between pre-degradation and post-degradation of the magnetic shielding layer caused by the magnetic flux.

According to an embodiment, the first column means that x0 coil is connected with the transmission circuit and x1 to x26 coils are connected with the reception circuit. That is, a current is applied to x0 to x26 coils and simultaneously a current value induced in the neighboring coils is measured. The table according to the present embodiment shows the degree of change caused by the degradation of the magnetic shielding layer.

According to an embodiment, it may be seen from the table that higher differences are measured in the x21 to x26 columns and x21 to x26 rows than in other areas. That is, the electronic device may detect the table and determine that the object having the magnetic flux are located in the proximity of x21 to x26 columns and x21 to x26 rows.

Figure 10:
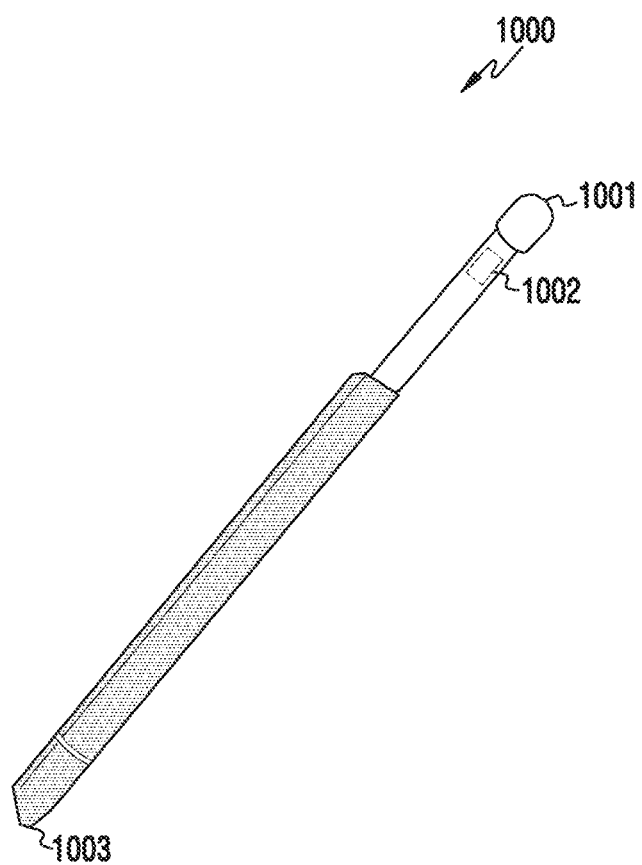
FIG. 10 illustrates a view showing a first embodiment of a configuration of an object provided with a magnetic flux according to various embodiments of the present disclosure.

FIG. 10 illustrates a view showing a first embodiment of an object which is provided with a magnetic flux (e.g., a magnet) according to various embodiments of the present disclosure.

Referring to FIG. 10, an object 1000 may be of a pen-type shape to input predetermined information to the electronic device, and may include a first input surface 1003 (one end or a front) and a second input surface 1001 (the other end opposite to the one end or a rear).

According to various embodiments of the present disclosure, the second input surface 1001 may be provided with rubber or the like which may recognize a touch screen panel of the electronic device, and a magnet 1002 may be provided in the proximity of the second input surface 1001.

According to various embodiments of the present disclosure, the electronic device may provide coordinates on an input through the magnet 1002 of the object 1000, and may provide coordinates on an input additionally using the second input surface 1001. According to an embodiment, the electronic device may provide coordinates information of the magnet 1002 at a different resolution according to the order of scanning coils connected with the transmission circuit and the reception circuit or the degree of precision of the coils.

For example, when more coils are included in the electronic device, the electronic device may provide the coordinates information on the magnet 1002 included in the object 1000 more precisely. In another example, when the electronic device changes the order of scanning the coils or the number of times of scanning the coils, the electronic device may provide the coordinates information on the magnet 1002 included in the object 1000 more precisely.

According to an embodiment of the present disclosure, the electronic device may obtain at least one of information indicating that the magnet 1002 is in the proximity of the electronic device or coordinates on the magnet 1002 through coils, and may obtain coordinates on an end portion of the object 1000 by combining coordinates on the second input surface 1001 or first coordinates on the magnet 1002 and second coordinates on the second input surface 1001. For example, when the electronic device identifies that the first coordinates and the second coordinates fall within a designated distance, the electronic device may determine that an input is generated by means of the end portion of the object 1000.

According to an embodiment of the present disclosure, the electronic device may detect that the object 1000 touches the electronic device using a touch screen which may detect pressure, a microphone of the electronic device, or a sensor of the electronic device. For example, the electronic device may monitor the microphone or the sensor while recognizing that the rear portion of the object 1000 hovers. In another example, when an audio signal of a designated frequency and a designated sound wave form is detected or a designated sensor value is detected, the electronic device may determine that a touch is performed.

According to an embodiment of the present disclosure, the electronic device may profile the magnetism characteristics of the object 1000 having magnetism and store the magnetism characteristics. For example, the profile may be generated using a current value which is measured when an object having magnetism is not in the proximity of the input device, and a current value which is measured when an object having magnetism is in the proximity of the input device. For example, the electronic device may store a profile of a first external device (e.g., a speaker) having a first magnetism characteristics. The profile may be stored by placing the first external device on the electronic device and storing obtained magnetism characteristics information, or by scanning the first external device on the electronic device and storing information.

As described above, the electronic device may store the respective magnetism characteristics, and may recognize the first external device while scanning the first external device and provide a relevant function. The above-described relevant function may be designated by the user or the electronic device may automatically determine the function relevant to the first external device. For example, the electronic device may scan an earphone or a speaker and provide setting information for setting a volume or an equalizer corresponding to the earphone or the speaker.

Figure 11:
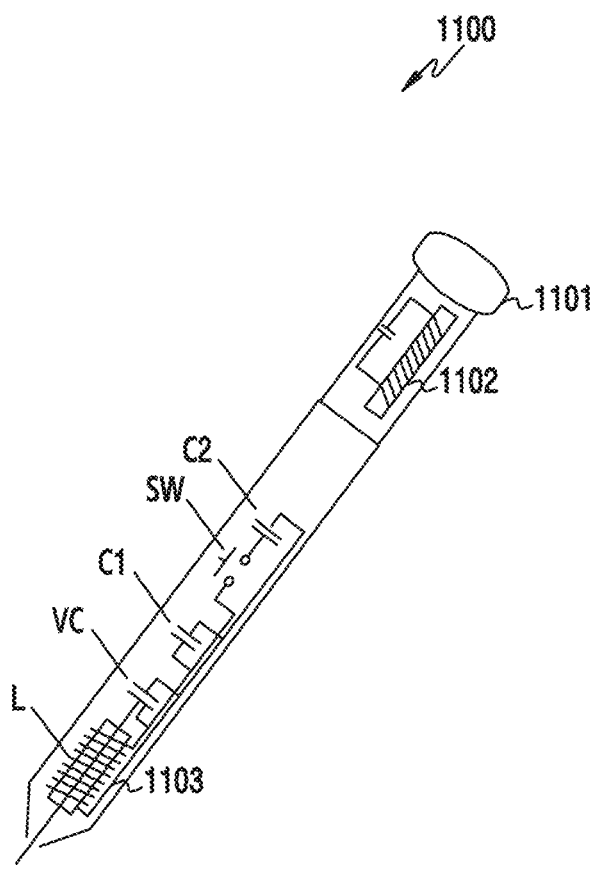
FIG. 11 illustrates a view showing a second embodiment of a configuration of an object provided with a magnetic flux according to various embodiments of the present disclosure.

FIG. 11 illustrates a second embodiment of a configuration of an object which is provided with a magnetic flux according to various embodiments of the present disclosure.

Referring to FIG. 11, an object 1100 may include a first LC resonant circuit 1103 formed on a first input surface (a front portion), and a second LC resonant circuit 1102 formed on an area adjacent to a second input surface 1101 (a rear portion).

According to an embodiment, the second LC resonant circuit 1102 may have a frequency different from that of the first LC resonant circuit 1103. According to an embodiment, since the first LC resonant circuit 1103 may be designed to have a designated resonant frequency, the electronic device may receive the signal of the designated resonant frequency and obtain information on whether the object 1100 hovers or not, information on whether the button is pressed or not, or information on a pen pressure state.

For example, since the first LC resonant circuit 1103 is a circuit which is made by precise frequency tuning, the object 1100 may transmit the information to the electronic device through the precise frequency of the first LC resonant circuit 1103.

According to an embodiment, the second LC resonant circuit 1102 may be manufactured at low cost in comparison with the first LC resonant circuit 1103. For example, the second LC resonant circuit 1102 does not require precise frequency tuning and may reduce a production cost due to its relative simple configuration. According to an embodiment, the electronic device may obtain coordinate information on signals transmitted from the second LC resonant circuit 1102 due to the simple configuration of the second LC resonant circuit 1102, but may not obtain touch information on the second LC resonant circuit 1102. In the above-described case, the object 1100 may further include the second input surface 1101.

According to an embodiment, the electronic device may obtain first coordinates through a digitizer and second coordinates through a touch screen panel. When the first coordinates and the second coordinates are located within a designated range, the electronic device may determine that a touch input is received through the second input surface 1101 of the object 1100 and may provide a corresponding event or function.

For example, when the electronic device determines that the first coordinates corresponding to the second LC resonant circuit 1102 and the second coordinates corresponding to the second input surface 1101 are located within a designated distance, the electronic device may determine that the touch input is received through the rear portion of the object 1100. In another example, when the electronic device determines that the first coordinates and the second coordinates are located at a designated distance or more from each other, the electronic device may determine that a hovering input is received through one side surface of the object 1100, and a touch input is received from a finger. According to an embodiment, the electronic device may obtain only a hovering input through the rear portion of the object 1100 and provide a corresponding function.

Figure 12:
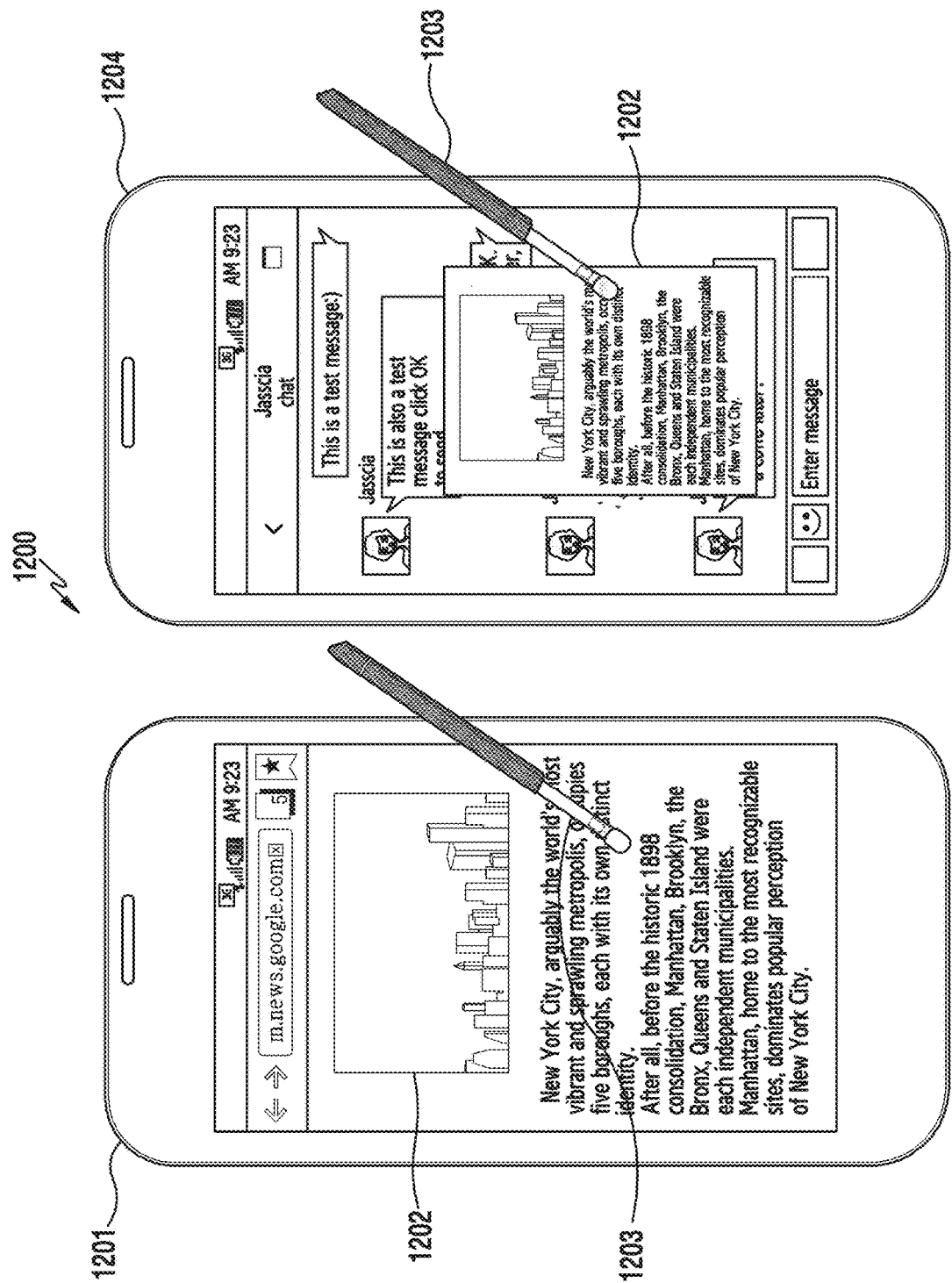
FIG. 12 illustrates a view showing a first embodiment in which various functions are performed using an input surface of an object according to various embodiments of the present disclosure.

FIG. 12 illustrates a view showing a first embodiment in which various functions are performed using an input surface of an object according to various embodiments of the present disclosure.

Referring to FIG. 12, an electronic device 1200 may include a first screen 1201 and a second screen 1204. The first screen 1201 and the second screen 1204 may be separate screens which are physically divided or may include screens logically divided. The electronic device may provide a first application 1202 (or a first function) through the first screen 1201, and provide a second application 1202 (or a second function) through the second screen 1204.

According to an embodiment, when a designated input (e.g., an input by a rear portion of a pen) is obtained from an object 1203 in an area corresponding to the first application 1202, the electronic device may copy at least part of the first application 1202 displayed on the first screen 1201 or a content corresponding to the designated input. For example, the electronic device may store at least part of the first application 1202 displayed on the first screen 1201 or the content in a memory or a cloud service. For example, the operation of copying may be provided in a designated mode (e.g., a copy mode or a capture mode). In another example, the operation of copying may be provided in combination with another input (e.g., a gesture or a button).

According to an embodiment, the electronic device may paste the copied part or content. For example, when a designated input (e.g., an input by the rear portion of the pen) is obtained in the second screen 1204, the electronic device may paste the at least part or content copied in the first screen 1201 on the second screen 1204.

According to an embodiment, when an input by the rear portion of the object 1203 to move at least part of the content displayed on the first screen 1202 from the first screen 1201 to the second screen 1204 (e.g., various gesture inputs such as dragging, flicking, and a gesture similar to that for throwing) is obtained, the electronic device may display the at least part or content on the second screen 1204.

Figure 13:
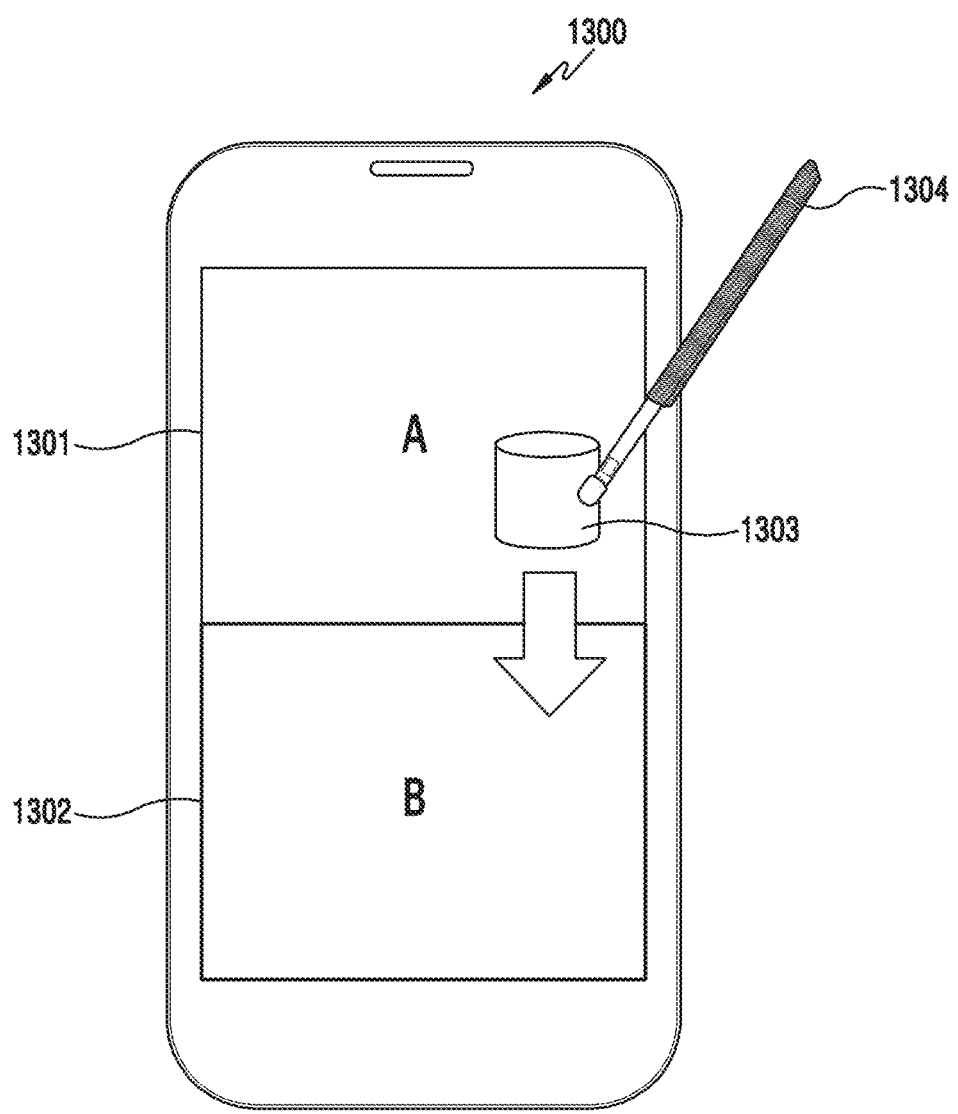
FIG. 13 illustrates a view showing a second embodiment in which various functions are performed using an input surface of an object according to various embodiments of the present disclosure.

FIG. 13 illustrates a view showing a second embodiment in which various functions are performed using an input surface of an object according to various embodiments of the present disclosure.

Referring to FIG. 13, an electronic device 1300 may provide a first application and a second application on windows 1301 and 1302 through a multi-window including the first window 1301 and the second window 1302.

According to various embodiments of the present disclosure, when a designated input for at least part of the first application provided on the first window 1301 or a content 1303 (e.g., various gestures such as a drag input by the rear portion of the object 1304 or a gesture for snapping and pushing rapidly) is obtained, the electronic device 1300 may move (or copy) the at least part or the content 1303 to the second window 1302 (or the second application).

According to various embodiments of the present disclosure, when a designated input for at least part of the second application provided on the second window 1302 or a content (e.g., various gestures such as a drag input by the rear portion of the object 1304 or a gesture for snapping and pushing rapidly) is obtained, the electronic device 1300 may move (or copy) the at least part or the content to the first window 1301 (or the first application).

Figure 14:
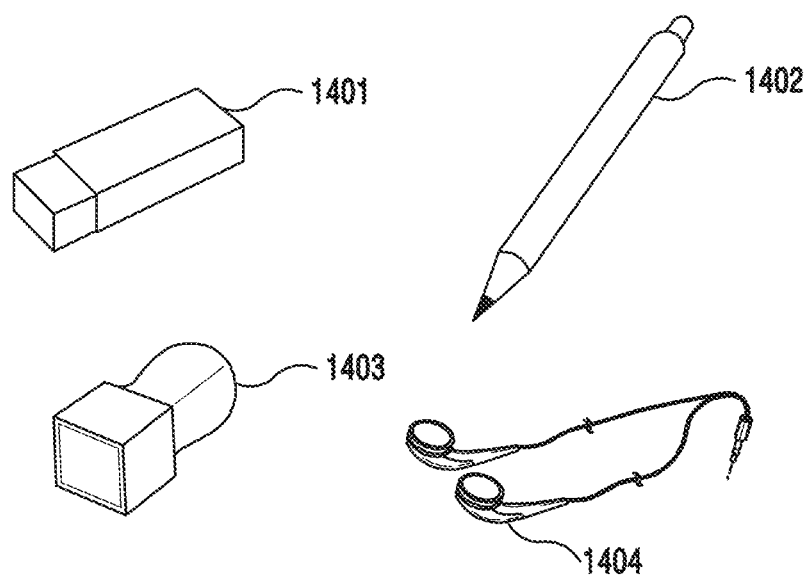
FIG. 14 illustrates a view showing various accessories which may be identified in an electronic device according to various embodiments of the present disclosure.

FIG. 14 illustrates a view showing various accessories which may be identified by an electronic device according to various embodiments of the present disclosure.

Referring to FIG. 14, a part which may be identified by the electronic device (e.g., a magnet or a resonant circuit included in an object) may be utilized for various types of accessories. For example, each of the accessories 1401, 1402, 1403, and 1404 may not be attached to the rear portion of an object and may be mounted and used in various accessories such as an eraser type accessory 1401, a pen type accessory 1402, a seal type accessory 1403, or the like as separate accessories.

According to an embodiment, the electronic device may obtain coordinates information on the earphone 1404 using a magnet included in the earphone 1404. According to an embodiment, the electronic device may obtain coordinates information on the earphone 1404 using rubber included in the earphone 1404. For example, the electronic device may be provided with an eraser function through the eraser type accessory 1401, or may be provided with hovering information through the pen type accessory 1402. In another example, the electronic device may be provided with a copy and paste function or a function of continuously pasting a designated content through the seal type accessory 1403.

According to various embodiments of the present disclosure, the electronic device may distinguish between the front portion and the rear portion of the object using information which is obtained through a coil or a magnetic sensor included in the electronic device. According to an embodiment, the electronic device may distinguish between a first resonant circuit (a circuit made through precise frequency tuning) included in the front portion of the object and a second resonant circuit included in the rear portion of the object by identifying the locations of the first resonant circuit and the second resonant circuit. According to an embodiment, when the object is an object of an ultrasonic method, the electronic device may distinguish between the front portion and the rear portion of the object according to an ultrasonic wave arriving time, a change in strength, or the like.

According to an embodiment, the front portion and the rear portion of the object may be interpreted as a first input and a second input, a first input attribute and a second input attribute, or a first accessory and a second accessory. In the above-described example, a function designated for the front portion of the object and a function designated for the rear portion are different from each other. However, the function designated for the front portion may be designated for the rear portion and the function designated for the rear portion may be designated for the front portion. In addition, the functions corresponding to the respective embodiments have been described for easy explanation, but the functions of the various embodiments may be combined.

According to various embodiments of the present disclosure, the electronic device may provide a writing function or a drawing function through the front portion of the object, and may provide an eraser function, a cancel function, a undo function, a scroll function, or a seal function through the rear portion of the object. For example, when the electronic device provides an application related to a note or writing, the electronic device may provide the writing function or the drawing function based on an input received through the front portion of the object. In addition, the electronic device may provide various functions such as the eraser function, the cancel function and the like, based on an input received through the rear portion of the pen, and may provide the undo function or the sealing function for inputting a specific character or image based on an input received through the rear portion of the object. In addition, the electronic device may perform the scroll function based on an input received through the rear portion of the object and may edit based on an input received through the front portion of the object.

According to various embodiments of the present disclosure, the electronic device may provide a content selection function through the front portion of the object and may provide a copy function, a paste function, or a cut function through the rear portion of the object. In addition, the electronic device may explore a program (e.g., a media player, and the like) such as a file explorer through the front portion of the object, and may provide various functions such as a content selection function, a highlight function, a hide function, etc. through the rear portion of the object.

Figure 15:
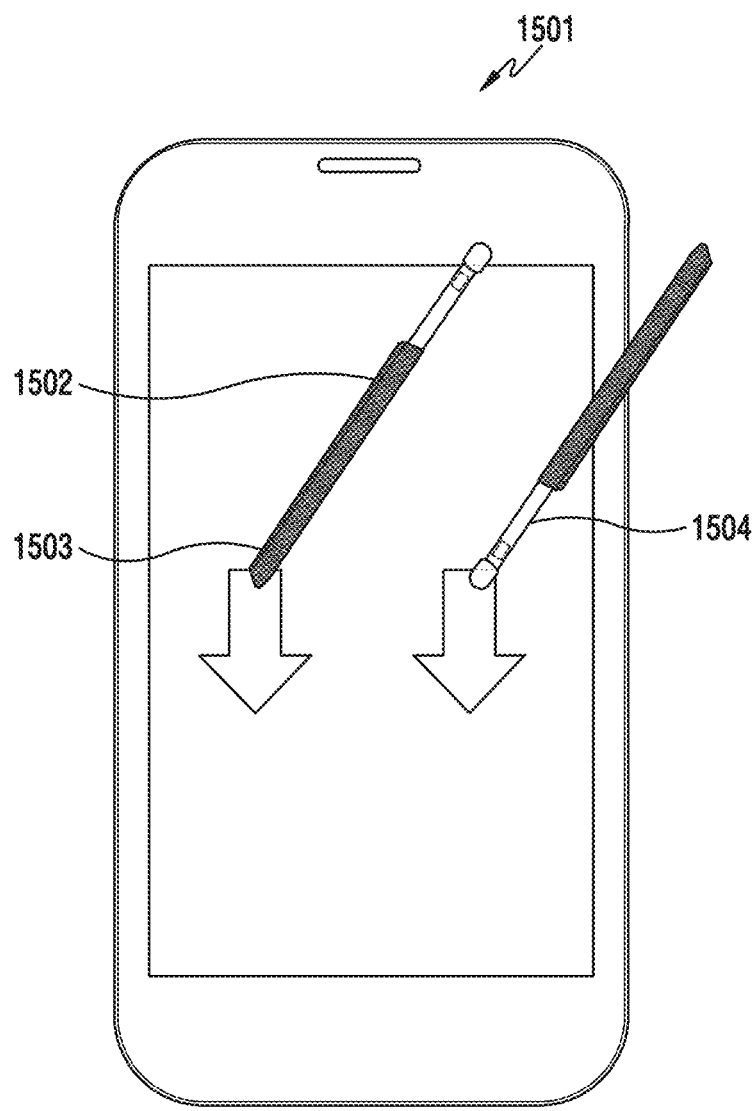
FIG. 15 illustrates a view showing a third embodiment in which various functions are performed using an input surface of an object according to various embodiments of the present disclosure.

FIG. 15 illustrates a view showing a third embodiment in which various functions are performed using an input surface of an object according to various embodiments of the present disclosure.

Referring to FIG. 15, an electronic device 1501 may provide an explore function or a scroll function through a front portion 1503 of an object 1502 and may provide a function of moving to an uppermost end, a function of moving to a lowermost end, a moving to a next sheet, or a scroll function at a different speed (e.g., high speed or low speed) through a rear portion 1504 of the object 1502.

For example, the electronic device may scroll at a first speed in response to a drag input through the front portion 1503 of the object 1502, and may scroll at a second speed (e.g., two times higher than the first speed) in response to a drag input through the rear portion 1504 of the object 1502. According to an embodiment, the electronic device may scroll to the end of the drag direction in response to the drag input through the rear portion 1504 of the object 1502. According to an embodiment, when an input through the rear portion 1504 of the object 1502 (e.g., an input including various gestures such as touching, double tapping, dragging, long touching, long hovering, a hovering gesture) is obtained from a designated area (e.g., a lowermost end area or an uppermost end area of a screen), the electronic device may move to the designated area as much as a designated size or move to the end of the designated area.

For example, the electronic device may provide various functions such as a function of capturing at least part of the screen, a memo function, a multi tasking conversion function, a designated menu showing function, an inter-tab conversion function, etc. through the rear portion 1504 of the object 1502 in the proximity of the uppermost end area in a browser or a list.

Figures 16A, 16B:
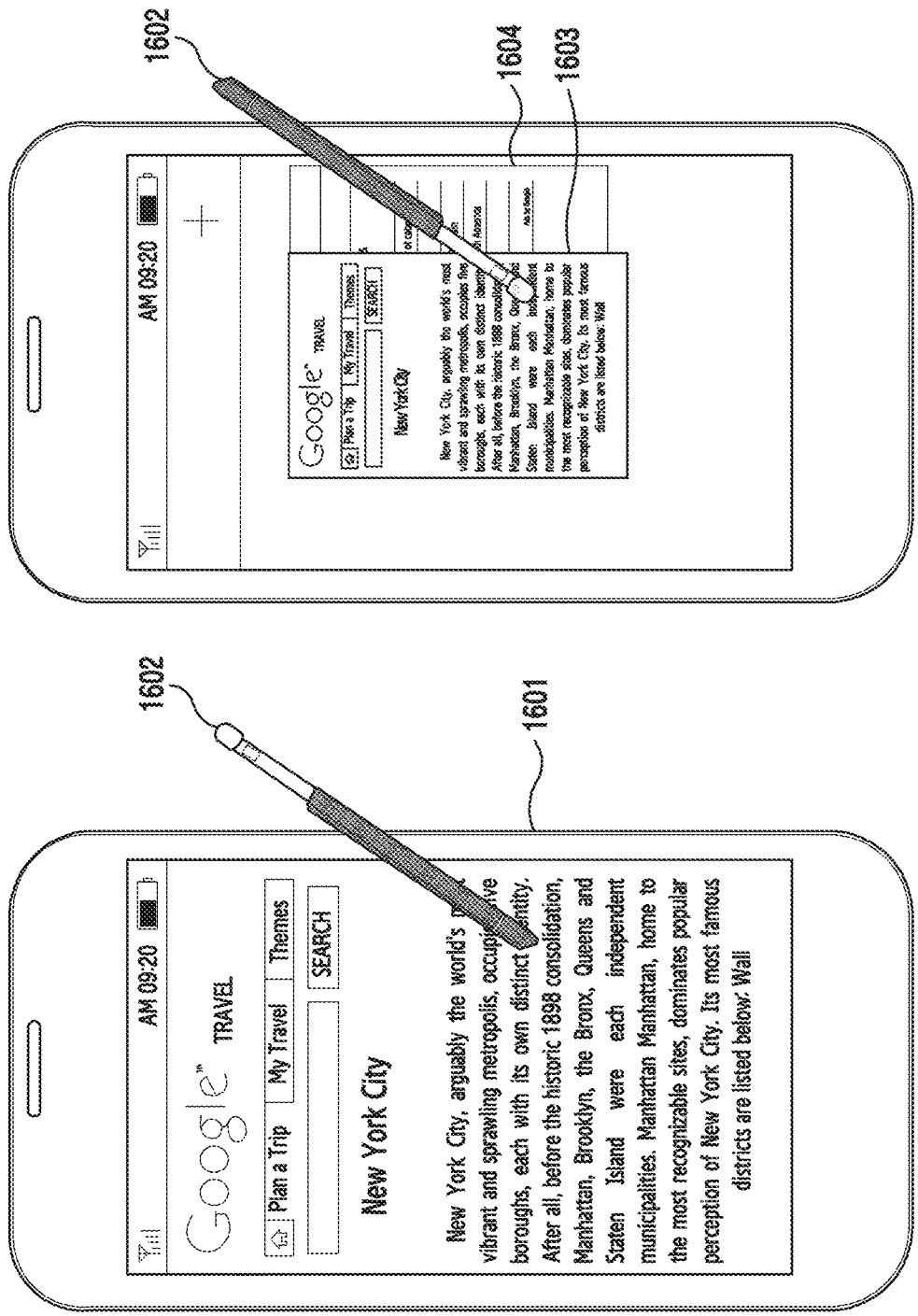
FIGS. 16A and 16B illustrate views showing a fourth embodiment in which various functions are performed using an input surface of an object according to various embodiments of the present disclosure.

FIGS. 16A and 16B illustrate views showing a fourth embodiment in which various functions are performed using an input surface of an object according to various embodiments of the present disclosure.

Referring to FIG. 16A, an electronic device may provide an inter-tab conversion function through an input through an object 1602. For example, the electronic device may display a first tab 1601 in a browser application.

According to an embodiment, the electronic device may provide an explore function of a browser through an input through the front portion of the object 1602. According to an embodiment, the electronic device may provide a menu for providing an inter-tab explore of the browser through an input through the rear portion of the object 1602. For example, the electronic device may display a first tab image 1603 and a second tab image 1604 to perform the inter-tab exploring.

According to an embodiment, the above-described operations may be applied to a multi-tasking operation, an inter-page moving operation, an index finding operation, an operation of finding a desired frame from a moving image, and the like.

Figure 17A:
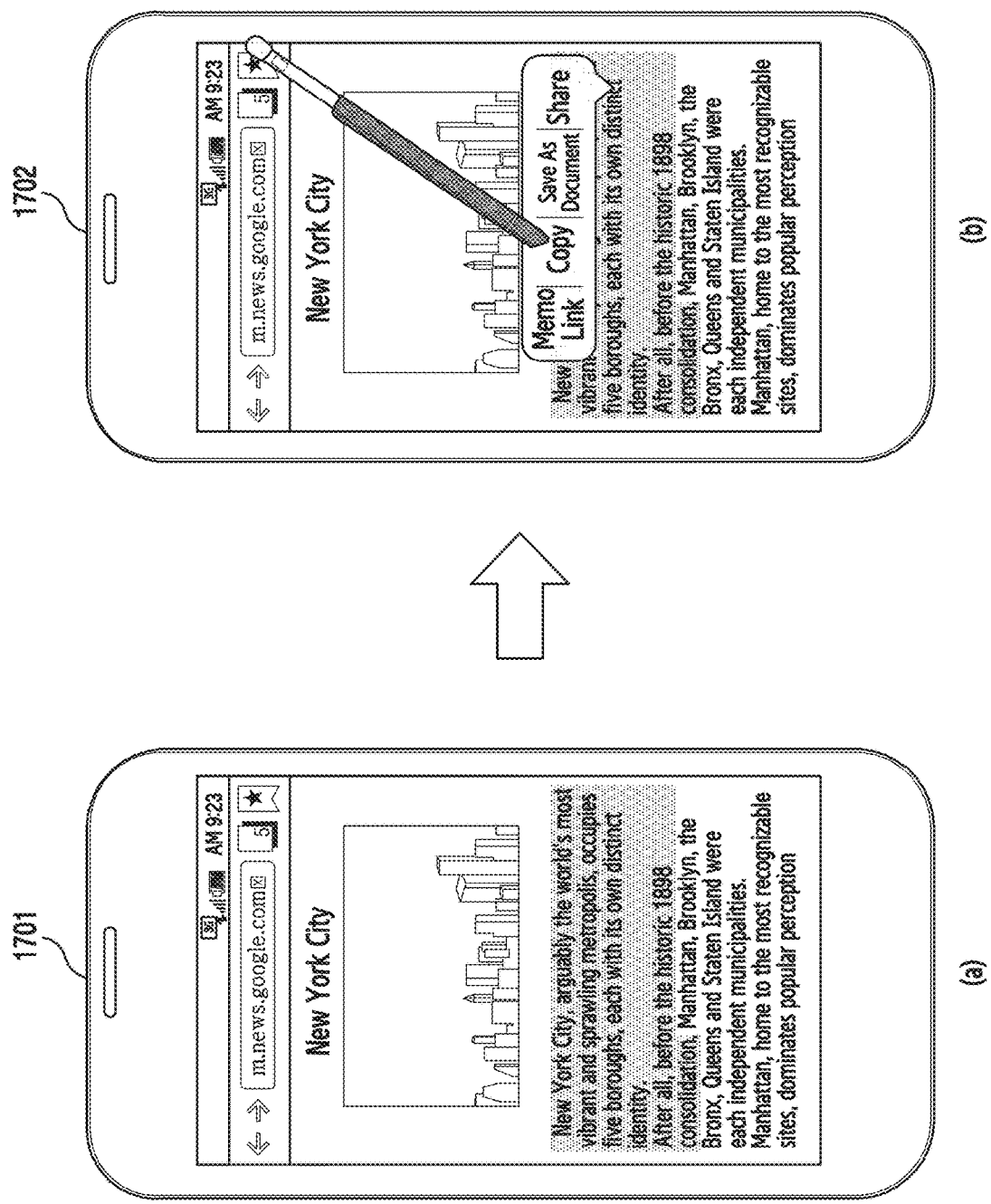
FIGS. 17A, 17B, and 17C illustrate views showing a fifth embodiment in which various functions are performed using an input surface of an object according to various embodiments of the present disclosure.
Figure 17B:
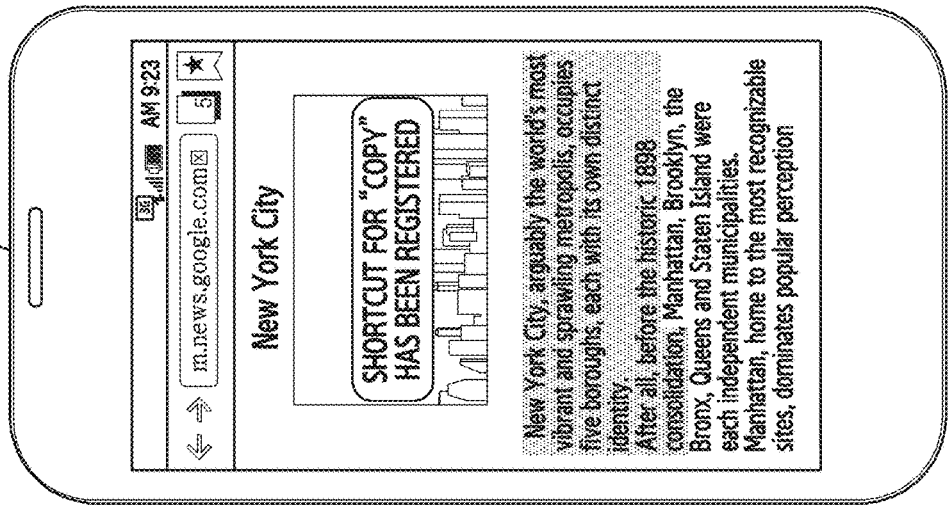
Figure 17B:
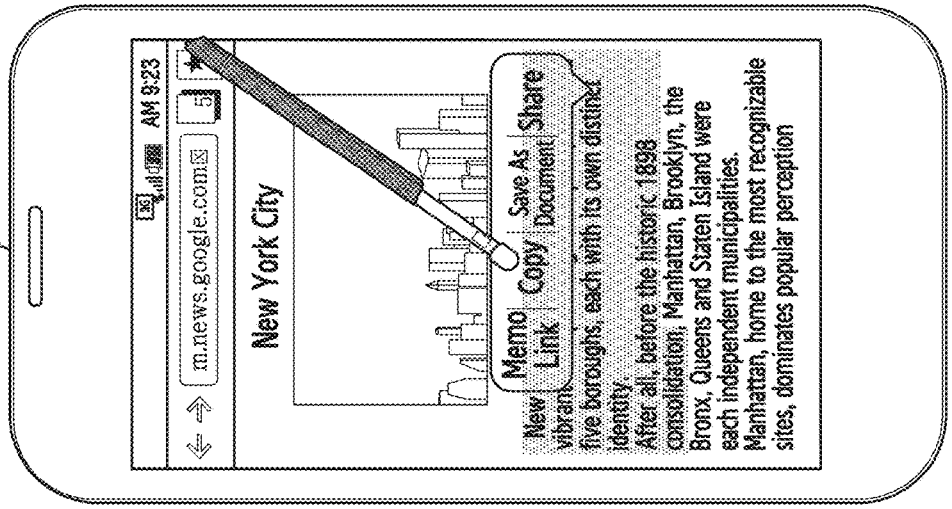
Figure 17C:
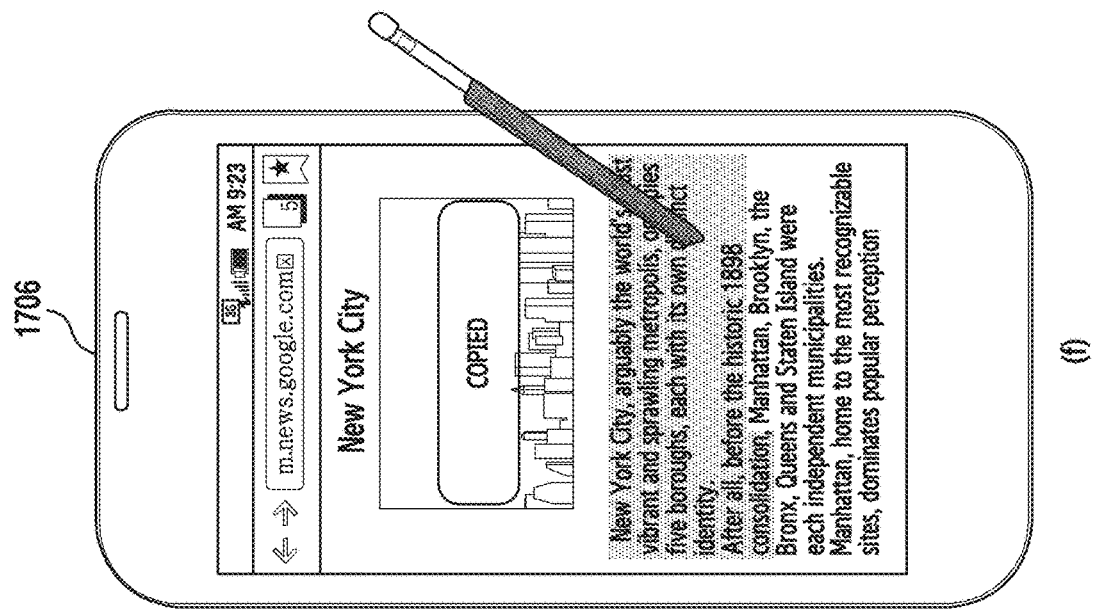
Figure 17C:
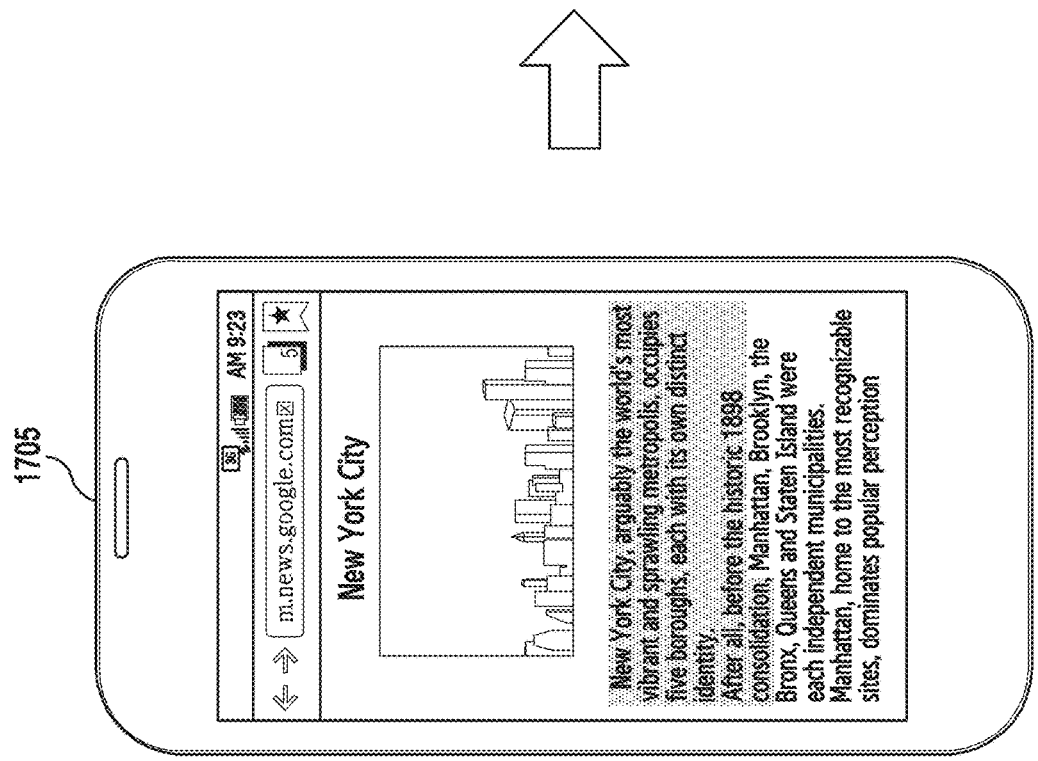

FIGS. 17A to 17C illustrate views showing a fifth embodiment in which various functions are performed using an input surface of an object according to various embodiments of the present disclosure.

Referring to FIGS. 17A to 17C, the electronic device may copy a specific function into the rear portion of an object. For example, a part which may be identified by the electronic device (e.g., a magnet or a resonant circuit) may be operated as a shortcut input means of a specific function.

Referring to FIG. 17A, as shown in views (a) and (b), an electronic device 1701 may select at least part of a content displayed on the display of the electronic device 1701, and then may display a menu for selecting an additional function related to the selected area in an electronic device 1702.

Referring to FIG. 17B, as shown in views (c) and (d), when an electronic device 1703 detects a designated input for a corresponding menu (e.g., selecting by the rear portion of the object), an electronic device 1704 may register the corresponding menu (e.g., copy) as a shortcut and display the result of the registering on the screen of the electronic device 1704.

Referring to FIG. 17C, when the shortcut is registered and the designated input (e.g., selecting by the rear portion of the object) is detected in the next operation, the electronic devices 1705 and 1706 may perform the shortcut operation omitting the input for selecting the corresponding menu as shown in views (d) and (e).

According to an embodiment, the electronic device may perform the shortcut operation only when the electronic device has the same menu tree. According to an embodiment, when a hovering input by the rear portion of the object is obtained in a state in which the shortcut is usable, the electronic device may display information on the shortcut function (e.g., copy) to respond to the hovering input.

According to an embodiment, the electronic device may provide a zoom-in function through a gesture (e.g., a double-tap, etc.) designated through the front portion of the object, and may recognize the rear portion of the object and provide a zoom-out function through a designated gesture (e.g., a double-tap, etc.).

According to an embodiment, the electronic device may provide an explore function through the front portion of the object and provide a magnifying function (e.g., a magnifying glass function) for a designated area through the rear portion of the object. For example, the electronic device may explore in a video player, a gallery, a file viewer or a browser through the front portion of the object, and magnify a specific portion through the rear portion of the object.

According to an embodiment, when the electronic device executes a function (e.g., various functions such as executing an application or opening a file) through an icon (e.g., an image or text) displayed on the electronic device using the front portion of the object, the electronic device may perform the function based on a first setting (e.g., a general mode). In addition, when the electronic device executes a function using the rear portion of the object, the electronic device may perform the function based on a second setting (e.g., a silent mode, a privacy protection mode).

For example, when the electronic device receives a call through the front portion of the object, the electronic device may receive the call using a first speaker (e.g., a built-in speaker or a speaker of a terminal). In addition, when the electronic device receives a call through the rear portion of the object, the electronic device may receive the call using a second speaker (e.g., a speaker phone or a speaker of a peripheral device).

According to an embodiment, the electronic device may provide an open and view function in an email or a message application through the front portion of the object, and provide a delete function, a process-as-read function, an important mail display function, etc. through the rear portion of the object.

According to an embodiment, when the electronic device moves a progress bar at a first speed (e.g., on a basis of about 5 seconds) in a media player through the front portion of the object, the electronic device may move the progress bar at a second speed (e.g., on a basis of about 1 second) through the rear portion of the object.

Figures 18A, 18B, 18C:
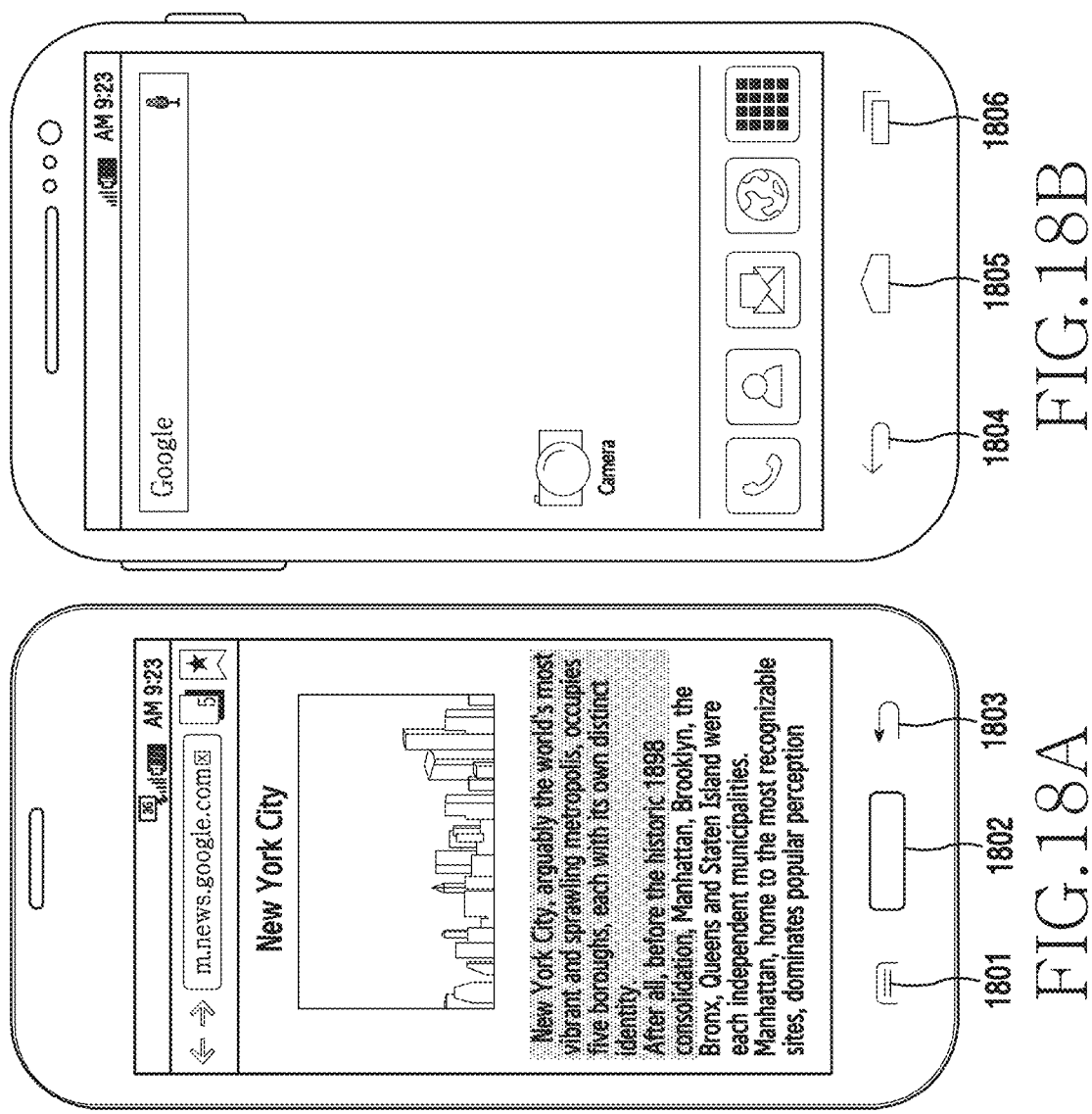
FIGS. 18A, 18B, and 18C illustrate views showing a sixth embodiment in which various functions are performed using an input surface of an object according to various embodiments of the present disclosure.

FIGS. 18A to 18C illustrate views showing a sixth embodiment in which various functions are performed using an input surface of an object according to various embodiments of the present disclosure.

Referring to FIGS. 18A to 18C, the electronic device may provide a different function according to the direction of an object inputted to a menu button. For example, the menu button may be a hardware button (e.g., 1801, 1802, 1803), a software button (e.g., 1804, 1805, 1806 and 1807) or a combination of them. For example, the menu button may include only one hardware button (e.g., 1802).

According to an embodiment, when a first menu button is inputted through the front portion of the object, the electronic device may provide a first function of the first menu button, and, when the first menu button is inputted through the rear portion of the object, the electronic device may provide a second function of the first menu button.

For example, when a button corresponding to a back function (e.g., 1803, 1804, or 1807) is inputted through the front portion of the object, the electronic device may provide a first function (e.g., a function of going backward once), and, when the button is inputted through the rear portion of the object, the electronic device may provide a second function (e.g., a function of going backward two times, a function of going to the end, a function of terminating, and the like).

In another example, when the button 1801 corresponding to a menu is inputted through the front portion of the object, the electronic device may provide a first function (e.g., settings, menus, and the like), and, when the button 1801 is inputted through the rear portion of the object, the electronic device may provide a second function (e.g., a list of applications being executed, multitasking, settings of an electronic device, and the like).

In another example, when the button corresponding to settings or menus (e.g., 1801) is inputted through the front portion of the object, the electronic device may not perform a corresponding operation in order to prevent an unintended touch input which may occur when the object is used, and perform the corresponding operation when a corresponding portion is inputted through the rear portion of the object.

Figure 19:
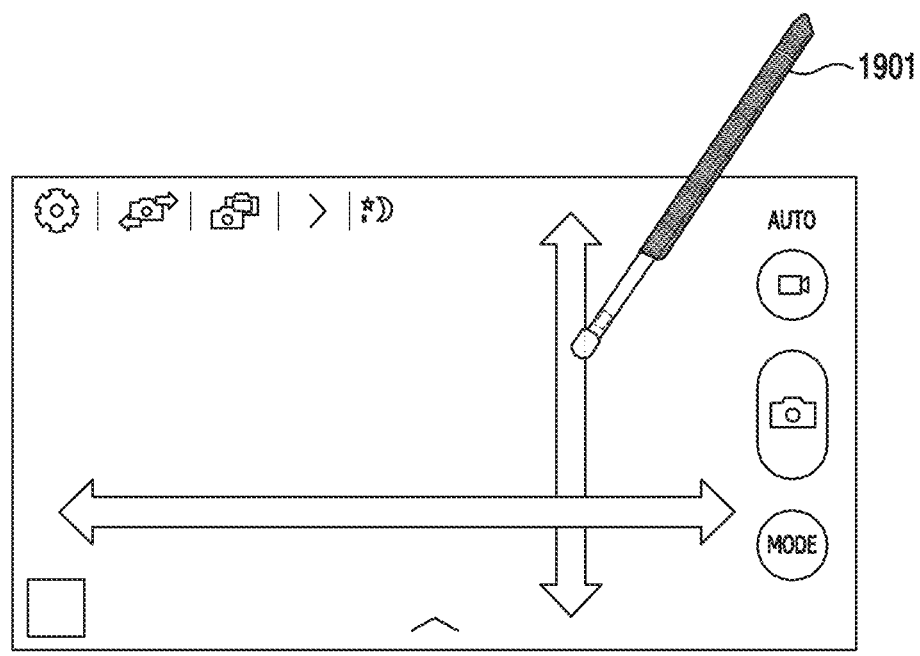
FIG. 19 illustrates a view showing a seventh embodiment in which various functions are performed using an input surface of an object according to various embodiments of the present disclosure.

FIG. 19 illustrates a view showing a seventh embodiment in which various functions are performed using an input surface of an object according to various embodiments of the present disclosure.

Referring to FIG. 19, when the electronic device executes a camera application, a manipulation through the front portion of an object 1901 may be performed by an existing camera manipulation, and a manipulation through the rear portion of the object may be provided by changing settings.

For example, when the electronic device detects a gesture of dragging the rear portion of an object 1901 upward, the electronic device may increase the brightness of the screen, and, when the electronic device detects a gesture of dragging the rear portion of the object 1501 downward, the electronic device may reduce the brightness of the screen.

According to an embodiment, when the electronic device detects hovering by the rear portion of the object 1901, the electronic device may magnify and display only the hovering area.

According to an embodiment, when the electronic device detects dragging horizontally by the rear portion of the object 1901, the electronic value may change an aperture value, change an international standards organization (ISO) value, change a white balance, change a photographing mode, or change a photographing effect.

Figure 20A:
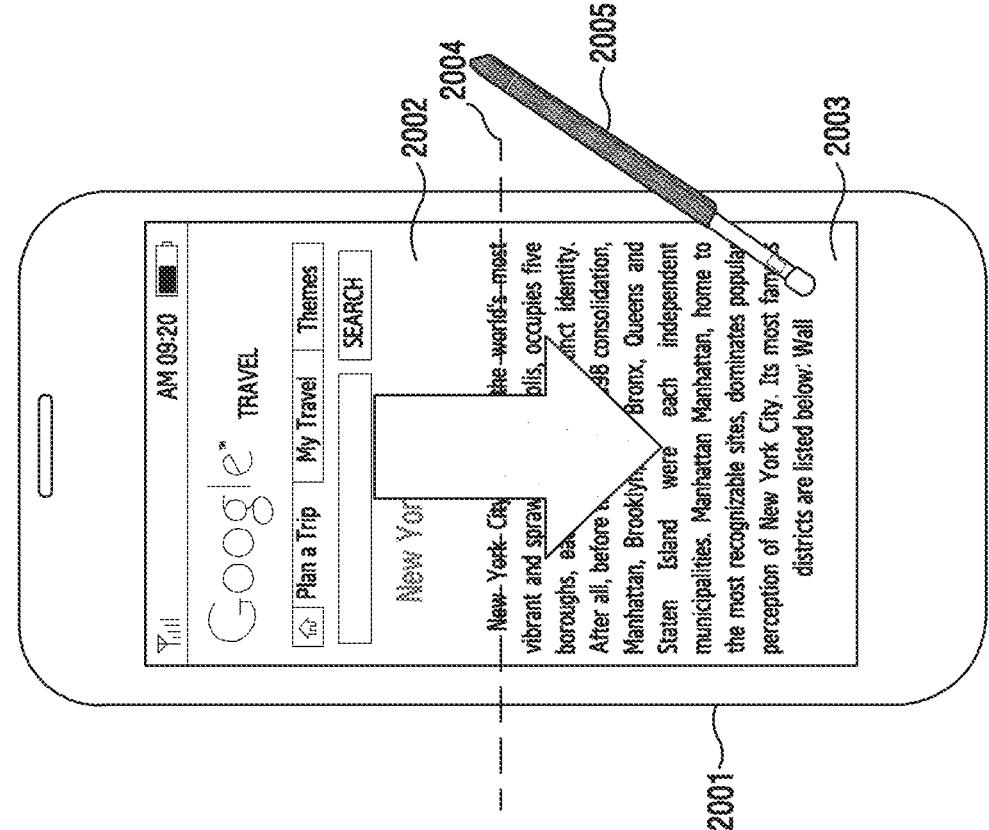
FIGS. 20A and 20B illustrate views showing an eighth embodiment in which various functions are performed using an input surface of an object according to various embodiments of the present disclosure.
Figure 20B:
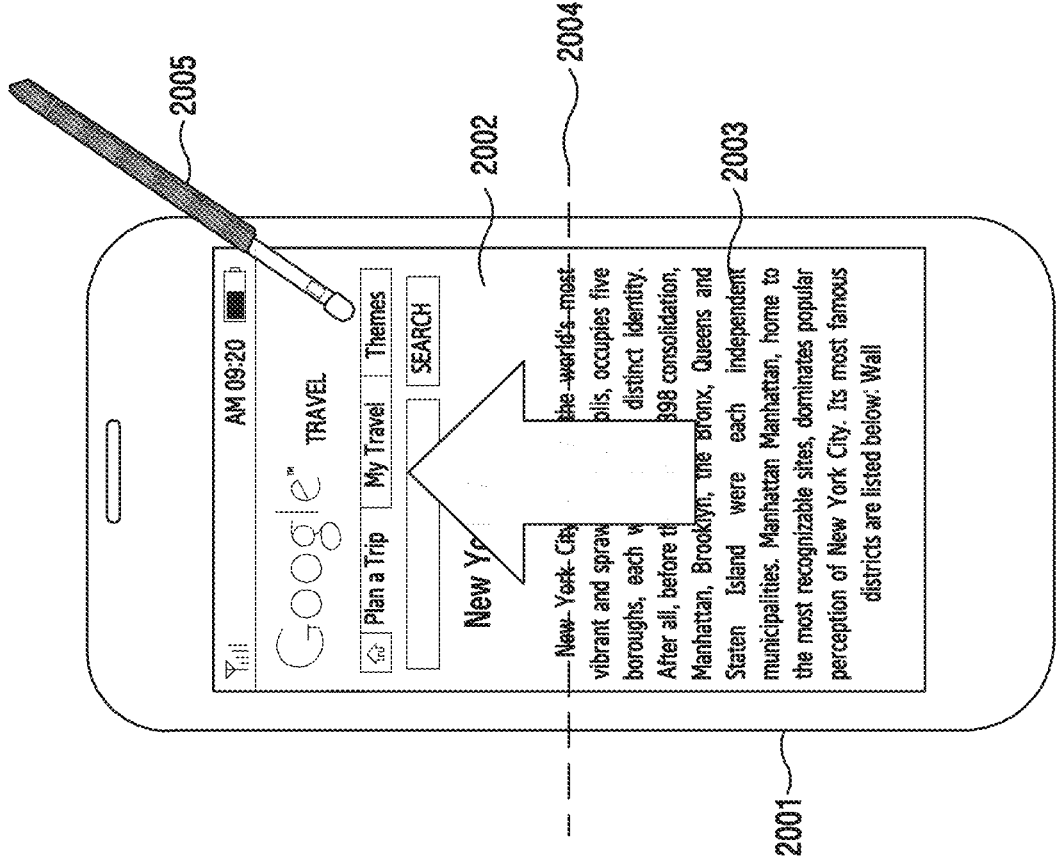

FIGS. 20A and 20B illustrate views showing an eighth embodiment in which various functions are performed using an input surface of an object according to various embodiments of the present disclosure. According to various embodiments of the present disclosure, the electronic device may detect the rear portion of the object when a scroll of a screen is needed, and may provide a scroll control command. Hereinafter, the embodiment in which various functions are performed using an input surface of an object will be explained with reference to FIGS. 20A and 20B.

Referring to FIG. 20A, the electronic device 2001 may display a content according to a user selection on the display of the electronic device. According to an embodiment, the electronic device 2001 has the display divided into an upper screen 2002 and a lower screen 2003 by a virtual division line 2004.

According to various embodiments of the present disclosure, when a touch input on the upper screen 2002 out of the screens 2002, 2003 divided by the virtual division line 2004 is received through the rear portion of an object 2005 as shown in FIG. 20A, the electronic device 2001 may scroll up the screen as much as a designated length.

Referring to FIG. 20B, when a touch input on the lower screen 2003 out of the screens 2002, 2003 divided by the virtual division line 2004 is received through the rear portion of the object 2005, the electronic device 2001 may scroll down the screen as much as a designated length.

Figure 21:
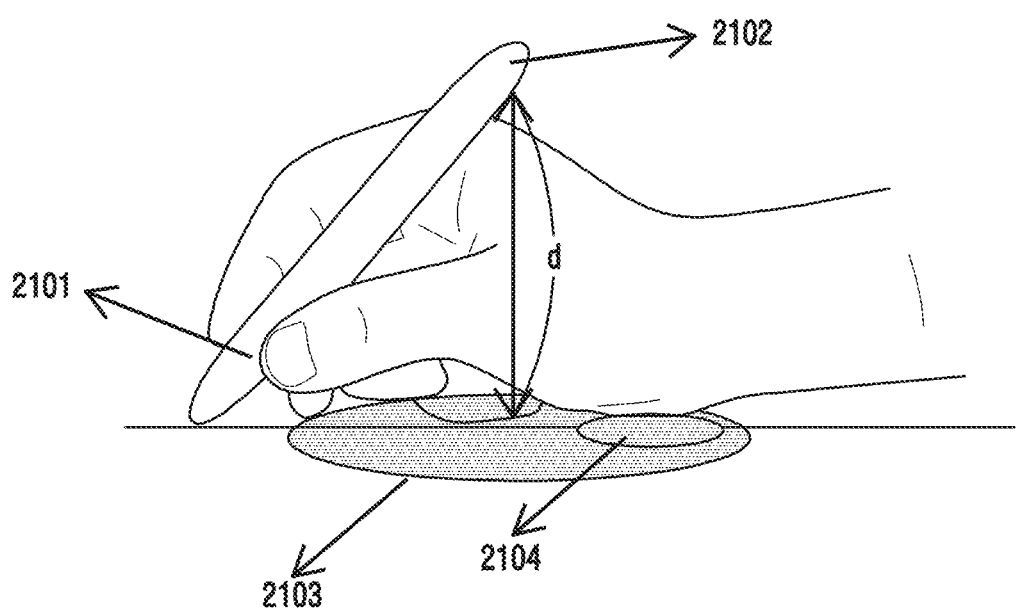
FIG. 21 illustrates a view showing an example for filtering a touch input except for object according to various embodiments of the present disclosure.

FIG. 21 illustrates a view showing an embodiment in which a touch input is filtered according to various embodiments of the present disclosure.

Referring to FIG. 21, when the electronic device receives a predetermined input using an object, the electronic device may provide a method for filtering a user's touch input inputted to a touch screen.

According to various embodiments of the present disclosure, when the electronic device detects a predetermined input from the object 2101, the electronic device may detect a straight-line distance (d) between the display and a magnet 2102 included in the object 2101, and then may detect an intersection point between the straight-line distance (d) and the display of the electronic device.

According to various embodiments of the present disclosure, when the electronic device detects the intersection point between the straight-line distance (d) and the display of the electronic device, the electronic device may set a designated area 2103 with reference to the detected intersection point.

According to various embodiments of the present disclosure, when the electronic device detects a touch input within the designated area 2103, the electronic device may filter the touch input within the designated area 2103. According to an embodiment, the electronic device may detect a predetermined input from the object 2101 and simultaneously or serially may block a touch error input area 2104 of the user within the designated area 2103.

Figure 22:
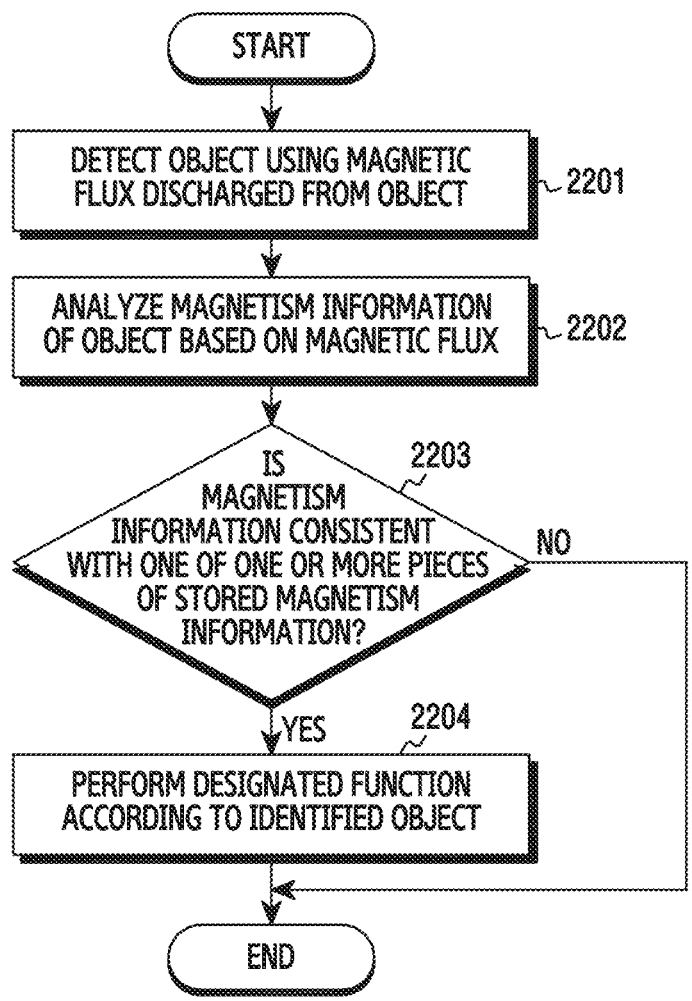
FIG. 22 illustrates a sequence diagram showing an operation of an electronic device according to various embodiments of the present disclosure.

FIG. 22 illustrates a sequence diagram showing an operation of an electronic device according to various embodiments of the present disclosure.

Referring to FIG. 22, in operation 2201, the electronic device may detect an object using a magnetic flux discharged from the object within (out of) a designated distance. In addition, according to various embodiments of the present disclosure, the operation of sensing the object may further include detecting an induced current in one or more coils from among a plurality of coils by measuring a current induced by the magnetic flux, and determining input coordinates of the object according to a location of one or more coils from which the induced current is detected.

In operation 2202, the electronic device may analyze magnetism information of the object based on the detected magnetic flux. According to an embodiment, the electronic device may analyze the magnetism information of the object in order to detect the kind of the object and the input location of the object.

In operation 2203, the electronic device may determine whether the magnetism information is consistent with one of one or more pieces of magnetism information stored.

According to an embodiment, since magnetism information of each of the objects provided with magnets is stored in the electronic device in advance, the electronic device may determine whether the analyzed magnetism information of the object is consistent with one piece of the stored magnetism information.

In operation 2204, when the magnetism information of the object is determined to be consistent with one piece of the stored magnetism information, the electronic device may perform a designated function according to the identified object. The operation of performing the designated function includes, when the identified object is of a pen type, determining an input surface of the object and performing a first function or a second function according to the determined input surface. The operation of determining the input surface may include obtaining first coordinates based on the magnetic flux discharged from the object, obtaining second coordinates by sensing an area which receives an input from the object through the touch screen, and determining coordinates corresponding to the object based on at least one of the first coordinates and the second coordinates.

When the object is the object shown in FIG. 11, the operation of determining the input surface according to various embodiments may include receiving one of a first frequency and a second frequency from the object, and, when the frequency is the first frequency, determining the input surface as a first surface, and, when the frequency is the second frequency, determining the input surface as a second surface.

In addition, according to various embodiments of the present disclosure, the first function or the second function may include at least one of an eraser function, an inter-application conversion function, a content selection function, a content magnification function, and a content reduction function.

In addition, according to various embodiments of the present disclosure, the operation of performing the designated function may include, when the object is a first object, performing a first designated function corresponding to the first object; and, when the object is a second object, performing a second designated function corresponding to the second object.

Figure 23:
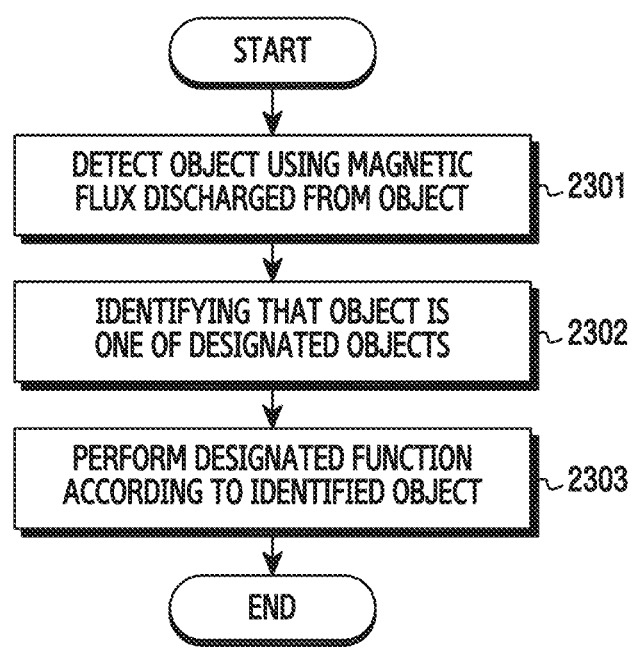
FIG. 23 illustrates a flowchart showing a method of an electronic device according to various embodiments of the present disclosure.

FIG. 23 illustrates a flowchart showing a method of an electronic device according to various embodiments of the present disclosure.

Referring to FIG. 23, in operation 2301, the electronic device may detect a magnetic flux discharged from an object within a designated distance. In addition, according to various embodiments of the present disclosure, the operation of sensing the object may further include detecting an induced current in one or more coils from among a plurality of coils by measuring a current induced by the magnetic flux, and determining input coordinates of the object according to a location of one or more coils from which the induced current is detected.

In operation 2302, the electronic device may identify that the object is one of the designated objects. According to an embodiment, the designated object may be an extra accessory and may be mounted and used in various accessories such as an eraser type accessory, a pen type accessory, a seal type accessory, etc.

In operation 2303, the electronic device may perform a designated function according to the identified object. According to an embodiment, the electronic device may perform an eraser function, an inter-application conversion function, a content selection function, a content magnification function, a content reduction function, etc. according to the identified object, as described in the above-described embodiments. The operation of performing the designated function includes, when the identified object is of a pen type, determining an input surface of the object and performing a first function or a second function according to the determined input surface. The operation of determining the input surface may include obtaining first coordinates based on the magnetic flux discharged from the object, obtaining second coordinates by sensing an area which receives an input from the object through the touch screen, and determining coordinates corresponding to the object based on at least one of the first coordinates and the second coordinates.

In addition, according to various embodiments of the present disclosure, the first function or the second function may include at least one of an eraser function, an inter-application conversion function, a content selection function, a content magnification function, and a content reduction function.

In addition, according to various embodiments of the present disclosure, the operation of performing the designated function may include, when the object is a first object, performing a first designated function corresponding to the first object; and, when the object is a second object, performing a second designated function corresponding to the second object.

According to various embodiments of the present disclosure, a method of an electronic device may include: applying a current to a first coil from among a plurality of coils of the electronic device and measuring an induced current of a second coil adjacent to the first coil; identifying information on an object which is located outside the electronic device based on the induced current; and performing a designated function based on a result of the identifying.

According to various embodiments of the present disclosure, the identifying the information on the object may include: analyzing magnetism information of the object based on the induced current; and identifying whether the analyzed magnetism information is consistent with one or more pieces of designated magnetism information.

According to various embodiments of the present disclosure, the performing the designated function may include: when the object is identified as a pen-type object, determining an input surface of the object; and performing a first function or a second function according to the determined input surface.

According to various embodiments of the present disclosure, the first function or the second function may include at least one of an eraser function, an inter-application conversion function, a content selection function, a content magnification function, and a content reduction function.

According to various embodiments of the present disclosure, the determining the input surface may include: obtaining first coordinates based on the induced current; obtaining second coordinates by sensing an area which receives an input from the object through a touch screen; and determining coordinates corresponding to the object based on at least one of the first coordinates and the second coordinates obtained.

According to various embodiments of the present disclosure, the performing the designated function may include: when the object is a first object, performing a first designated function corresponding to the first object; and when the object is a second object, performing a second designated function corresponding to the second object.

According to various embodiments of the present disclosure, the function corresponding to the second object may include a function of executing an application related to the second object.

According to various embodiments of the present disclosure, the performing the designated function may include: distinguishing between a front and a rear of the object; and, when the front of the object is identified, performing a first function, and, when the rear of the object is identified, performing a second function.

According to various embodiments of the present disclosure, the distinguishing may use at least one of a current which is obtained in the plurality of coils or a value which is measured in a geomagnetic sensor.

According to various embodiments of the present disclosure, an electronic device may include: a processor configured to apply a current to a first coil from among a plurality of coils of the electronic device and measure an induced current of a second coil adjacent to the first coil, identify information on an object which is located outside the electronic device based on the induced current, and perform a designated function based on a result of the identifying; and a memory configured to store data which is controlled by the processor.

According to various embodiments of the present disclosure, the processor may be configured to analyze magnetism information of the object based on the induced current, and identify whether the analyzed magnetism information is consistent with one or more pieces of designated magnetism information.

According to various embodiments of the present disclosure, when the object is identified as a pen-type object, the processor may be configured to determine an input surface of the object, and perform a first function or a second function according to the determined input surface.

According to various embodiments of the present disclosure, the first function or the second function may include at least one of an eraser function, an inter-application conversion function, a content selection function, a content magnification function, and a content reduction function.

According to various embodiments of the present disclosure, the processor may be configured to obtain first coordinates based on the induced current, obtain second coordinates by sensing an area which receives an input from the object through a touch screen, and determine coordinates corresponding to the object based on at least one of the first coordinates and the second coordinates obtained.

According to various embodiments of the present disclosure, when the object is a first object, the processor may be configured to perform a first designated function corresponding to the first object, and, when the object is a second object, the processor may be configured to perform a second designated function corresponding to the second object.

According to various embodiments of the present disclosure, the processor may be configured to distinguish between a front and a rear of the object, and, when the front of the object is identified, the processor may be configured to perform a first function, and, when the rear of the object is identified, the processor may be configured to perform a second function.

According to various embodiments of the present disclosure, the front and the rear of the object are distinguished from each other using at least one of a current which is obtained in the plurality of coils or a value which is measured in a geomagnetic sensor.

According to various embodiments of the present disclosure, a method of an electronic device may include: sensing an object using a frequency discharged from the object which is located outside within a designated distance from the electronic device; identifying information on the object based on the frequency; performing a designated function based on a result of the identifying; when the object is identified as a pen-type object, determining an input surface of the object; and performing a first function or a second function according to the determined input surface.

According to various embodiments of the present disclosure, the determining the input surface may include: receiving one of a first frequency and a second frequency from the object; when the frequency is the first frequency, determining the input surface of the object as a first surface; and when the frequency is the second frequency, determining the input surface of the object as a second surface.

According to various embodiments of the present disclosure, the object may be of a pen type, and the first surface may be provided with a first resonant circuit and the second surface may be provided with a second resonant circuit.

According to various embodiments of the present disclosure, when the designated object is a pen type object, the input surface of the object may be identified.

According to various embodiments of the present disclosure, various functions may be provided according to the input surface of the object.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device, the method comprising:
    applying, by a processor, a current to a first coil among a plurality of coils of the electronic device;
    measuring, by the processor, a first current of a second coil among the plurality of coils while applying the current to the first coil, wherein the first current is induced by a magnetic flux which is generated through the first coil;
    measuring, by the processor, a second current of the second coil among the plurality of coils while applying the current to the first coil is stopped, wherein the second current is induced by a magnetic flux which is generated through an object;
    identifying, by the processor, a type of the object which is located outside the electronic device and an input location of the object based on the induced first current and second current; and
    performing, by the processor, at least one function associated with the type of the object, based on the input location of the object,
    wherein the object comprises a plurality of input regions used for an input by the object for the electronic device, and
    wherein the identifying of the input location comprises identifying one input region among the plurality of input regions.

2. The method of claim 1, wherein the identifying of the type of the object and the input location of the object comprises:
    analyzing magnetism information of the object based on the induced current; and
    identifying the type of the object by determining whether the analyzed magnetism information is consistent with one or more of pre-stored magnetism information.

3. The method of claim 1, wherein the function comprises at least one of an eraser function, an inter-application conversion function, a content selection function, a content magnification function, or a content reduction function.

4. The method of claim 1, wherein the identifying of the type of the object and the input location of the object comprises:
    obtaining first coordinates based on the induced current;
    obtaining second coordinates by sensing an area which receives an input from the object through a touch screen; and
    determining coordinates corresponding to the input location of the object based on at least one of the first coordinates or the second coordinates obtained.

5. The method of claim 1, wherein the performing of the function comprises:
    performing, when the type of the object is a first type, a first function corresponding to a first type of object; and
    performing, when the type of the object is a second type, a second function corresponding to a second type of object.

6. The method of claim 5, wherein the second function corresponding to the second type object comprises a function of executing an application related to the second type object.

7. The method of claim 1, wherein the performing of the function comprises:
    determining whether a portion of the object used for a touch input is a front portion or a rear portion;
    when the portion of the object used for the touch input is the front portion of the object, performing a first function corresponding to the front portion of the object; and
    when the portion of the object used for the touch input is the rear portion of the object, performing a second function corresponding to the rear portion of the object.

8. The method of claim 7, wherein the determining whether the portion of the object used for the touch input is the front portion or the rear portion comprises:
    determining whether the portion of the object used for the touch input is the front portion or the rear portion based on at least one of a current which is obtained in the plurality of coils or a value which is measured in a geomagnetic sensor.

9. An electronic device, the electronic device comprising:
    a processor; and
    a memory configured to store instructions that, when executed, cause the processor to:
        apply a current to a first coil among a plurality of coils of the electronic device,
        measure a first current of a second coil among the plurality of coils while applying the current to the first coil, wherein the first current is induced by a magnetic flux which is generated through the first coil,
        measure a second current of the second coil among the plurality of coils while applying the current to the first coil is stopped, wherein the second current is induced by a magnetic flux which is generated through an object,
        identify a type of the object which is located outside the electronic device and an input location of the object based on the induced first current and second current, and
        perform at least one function associated with the type of the object, based on the input location of the object, wherein the object comprises a plurality of input regions used for an input by the object for the electronic device, and wherein the processor is further configured to identify one input region among the plurality of input regions.

10. The electronic device of claim 9, wherein the processor is further configured to:

analyze magnetism information of the object based on the induced current, and identify the type of the object by determining whether the analyzed magnetism information is consistent with one or more of pre-stored magnetism information.

11. The electronic device of claim 9, wherein the function comprises at least one of an eraser function, an inter-application conversion function, a content selection function, a content magnification function, or a content reduction function.

12. The electronic device of claim 9, wherein the processor is further configured to:

obtain first coordinates based on the induced current, obtain second coordinates by sensing an area which receives an input from the object through a touch screen, and determine coordinates corresponding to the input location of the object based on at least one of the first coordinates or the second coordinates obtained.

13. The electronic device of claim 9, wherein, when the type of the object is a first type, the processor is further configured to perform a first function corresponding to the first type, and wherein, when the type of the object is a second type, the processor is further configured to perform a second function corresponding to the second type of object.

14. The electronic device of claim 9, wherein the processor is further configured to determine whether a portion of the object used for a touch input is a front portion or a rear portion, wherein, when the portion of the object used for the touch input is the front portion of the object, the processor is further configured to perform a first function corresponding to the front portion of the object, and wherein, when the portion of the object used for the touch input is the rear portion of the object, the processor is further configured to perform a second function corresponding to the rear portion of the object.

15. The electronic device of claim 14, wherein the processor is further configured to determine whether the portion of the object used for the touch input is the front portion or the rear portion based on at least one of a current which is obtained in the plurality of coils or a value which is measured in a geomagnetic sensor.

* * * * *